US011081996B2

(12) United States Patent
Ritchey

(10) Patent No.: US 11,081,996 B2
(45) Date of Patent: Aug. 3, 2021

(54) VARIABLE COIL CONFIGURATION SYSTEM CONTROL, APPARATUS AND METHOD

(71) Applicant: DPM TECHNOLOGIES INC., Vancouver (CA)

(72) Inventor: Jonathan Gale Ritchey, Kelowna (CA)

(73) Assignee: DPM Technologies Inc., Vancouver (CA)

( * ) Notice: Subject to any disclaimer, the term of this patent is extended or adjusted under 35 U.S.C. 154(b) by 29 days.

(21) Appl. No.: 16/615,493

(22) PCT Filed: Feb. 27, 2018

(86) PCT No.: PCT/CA2018/050222
§ 371 (c)(1),
(2) Date: Nov. 21, 2019

(87) PCT Pub. No.: WO2018/213919
PCT Pub. Date: Nov. 29, 2018

(65) Prior Publication Data
US 2020/0076345 A1    Mar. 5, 2020

Related U.S. Application Data

(60) Provisional application No. 62/510,138, filed on May 23, 2017.

(51) Int. Cl.
*H02P 25/18* (2006.01)
(52) U.S. Cl.
CPC .......... *H02P 25/188* (2013.01); *H02P 25/184* (2013.01)

(58) Field of Classification Search
CPC .......................... H02P 25/188; H02P 25/184
USPC ........................ 318/497, 495, 494
See application file for complete search history.

(56) References Cited

U.S. PATENT DOCUMENTS

| 908,097 A | 12/1908 | Herz |
| 1,980,808 A | 11/1934 | Leibing |
| 2,091,190 A | 8/1937 | Tullio |
| 2,189,524 A | 2/1940 | Randolph et al. |
| 2,407,883 A | 9/1946 | Corwill |
| 2,430,886 A | 11/1947 | Glen |
| 2,432,117 A | 12/1947 | Morton |
| 2,488,729 A | 11/1949 | Kooyman |
| 2,504,681 A | 4/1950 | Hall |

(Continued)

FOREIGN PATENT DOCUMENTS

| CA | 1038918 A | 9/1978 |
| CA | 2459126 A1 | 4/2003 |

(Continued)

OTHER PUBLICATIONS

Canadian Examination Report, dated Mar. 3, 2017, for CA 2,773,102, 4 pages.

(Continued)

*Primary Examiner* — David Luo
(74) *Attorney, Agent, or Firm* — Cozen O'Connor

(57) ABSTRACT

This application generally relates to electric machines with coils or windings (e.g., generators and motors), and more particularly to systems, apparatus, and methods that configure coils or windings of electric machines, for instance dynamically in response to operational condition and under load.

25 Claims, 16 Drawing Sheets

(56) References Cited

U.S. PATENT DOCUMENTS

| | | |
|---|---|---|
| 2,516,114 A | 7/1950 | Green |
| 2,601,517 A | 6/1952 | Hammes |
| 2,680,822 A | 6/1954 | Brainard |
| 2,719,931 A | 10/1955 | William |
| 3,083,311 A | 3/1963 | Shelley |
| 3,149,256 A | 9/1964 | Walter |
| 3,153,157 A | 10/1964 | Erich |
| 3,169,203 A | 2/1965 | Lavin et al. |
| 3,223,865 A | 12/1965 | Lewis |
| 3,237,034 A | 2/1966 | Shelley |
| 3,293,470 A | 12/1966 | Richard |
| 3,411,027 A | 11/1968 | Heinz |
| 3,482,156 A | 12/1969 | Porath |
| 3,549,925 A | 12/1970 | Johnson |
| 3,621,370 A | 11/1971 | Vandervort |
| 3,713,015 A | 1/1973 | Frister |
| 3,801,844 A | 4/1974 | Steele |
| 3,809,936 A | 5/1974 | Klein |
| 3,870,928 A | 3/1975 | Allen |
| 3,903,863 A | 9/1975 | Katsumata |
| 3,942,913 A | 3/1976 | Bokelman |
| 3,944,855 A | 3/1976 | Le |
| 3,965,669 A | 6/1976 | Larson et al. |
| 3,973,137 A | 8/1976 | Drobina |
| 3,973,501 A | 8/1976 | Briggs |
| 3,984,750 A | 10/1976 | Pfeffer et al. |
| 3,992,641 A | 11/1976 | Heinrich et al. |
| 4,001,887 A | 1/1977 | Platt et al. |
| 4,004,426 A | 1/1977 | Laing |
| 4,013,937 A | 3/1977 | Pelly et al. |
| 4,015,174 A | 3/1977 | Cotton |
| 4,020,369 A | 4/1977 | Shoupp et al. |
| 4,023,751 A | 5/1977 | Richard |
| 4,039,848 A | 8/1977 | Winderl |
| 4,050,295 A | 9/1977 | Harvey |
| 4,051,402 A | 9/1977 | Gruber |
| 4,074,159 A | 2/1978 | Robison |
| 4,074,180 A | 2/1978 | Sharpe et al. |
| 4,081,726 A | 3/1978 | Brimer et al. |
| 4,095,922 A | 6/1978 | Farr |
| 4,100,743 A | 7/1978 | Trumbull et al. |
| 4,107,987 A | 8/1978 | Robbins et al. |
| 4,126,933 A | 11/1978 | Anderson et al. |
| 4,141,331 A | 2/1979 | Mallory, Jr. |
| 4,142,696 A | 3/1979 | Nottingham |
| 4,142,969 A | 3/1979 | Funk et al. |
| 4,151,051 A | 4/1979 | Evans |
| 4,155,252 A | 5/1979 | Morrill |
| 4,159,496 A | 6/1979 | Stevens |
| 4,167,692 A | 9/1979 | Sekiya et al. |
| 4,168,459 A | 9/1979 | Roesel |
| 4,179,633 A | 12/1979 | Kelly |
| 4,181,468 A | 1/1980 | Kent et al. |
| 4,187,441 A | 2/1980 | Oney |
| 4,191,893 A | 3/1980 | Grana et al. |
| 4,196,572 A | 4/1980 | Hunt |
| 4,203,710 A | 5/1980 | Farr |
| 4,211,945 A | 7/1980 | Tawse |
| 4,215,426 A | 7/1980 | Klatt |
| 4,237,391 A | 12/1980 | Schur et al. |
| 4,245,601 A | 1/1981 | Crowder |
| 4,246,490 A | 1/1981 | Keramati et al. |
| 4,247,785 A | 1/1981 | Apgar |
| 4,253,031 A | 2/1981 | Frister |
| 4,254,344 A | 3/1981 | Fancy et al. |
| 4,260,901 A | 4/1981 | Woodbridge |
| 4,261,312 A | 4/1981 | Hart |
| 4,261,562 A | 4/1981 | Flavell |
| 4,276,461 A | 6/1981 | Parker |
| 4,286,581 A | 9/1981 | Atkinson |
| 4,289,970 A | 9/1981 | Deibert |
| 4,291,235 A | 9/1981 | Bergey et al. |
| 4,297,604 A | 10/1981 | Tawse |
| 4,302,683 A | 11/1981 | Burton |
| 4,305,031 A | 12/1981 | Wharton |
| 4,308,479 A | 12/1981 | Richter |
| 4,316,096 A | 2/1982 | Syverson |
| 4,317,437 A | 3/1982 | Lindgren |
| 4,322,667 A | 3/1982 | Ohba |
| 4,329,138 A | 5/1982 | Riordan |
| 4,338,557 A | 7/1982 | Wanlass |
| 4,339,704 A | 7/1982 | McSparran et al. |
| 4,340,822 A | 7/1982 | Gregg |
| 4,355,276 A | 10/1982 | Vittay |
| 4,358,693 A | 11/1982 | Palmer et al. |
| 4,364,005 A | 12/1982 | Kohzai et al. |
| 4,373,488 A | 2/1983 | Neuhalfen |
| 4,385,246 A | 5/1983 | Schur et al. |
| 4,389,691 A | 6/1983 | Hancock |
| 4,394,720 A | 7/1983 | Gabor |
| 4,402,524 A | 9/1983 | D et al. |
| 4,406,950 A | 9/1983 | Roesel |
| 4,412,170 A | 10/1983 | Roesel |
| 4,419,617 A | 12/1983 | Retz |
| 4,433,280 A | 2/1984 | Lindgren |
| 4,433,355 A | 2/1984 | Chew et al. |
| 4,434,389 A | 2/1984 | Langley et al. |
| 4,434,617 A | 3/1984 | Walsh |
| 4,444,444 A | 4/1984 | Benedetti et al. |
| 4,446,377 A | 5/1984 | Kure-Jensen et al. |
| 4,454,865 A | 6/1984 | Tammen |
| 4,456,858 A | 6/1984 | Loven |
| 4,458,469 A | 7/1984 | Walsh |
| 4,459,536 A | 7/1984 | Wirtz |
| 4,473,751 A | 9/1984 | Rombach et al. |
| 4,477,745 A | 10/1984 | Lux |
| 4,503,368 A | 3/1985 | Sakamoto |
| 4,511,805 A | 4/1985 | Boy-Marcotte et al. |
| 4,513,576 A | 4/1985 | Dibrell et al. |
| 4,536,668 A | 6/1985 | Boyer |
| RE31,947 E | 7/1985 | Farr |
| 4,532,431 A | 7/1985 | Iliev et al. |
| 4,532,460 A | 7/1985 | Gale et al. |
| 4,535,263 A | 8/1985 | Avery |
| 4,536,672 A | 8/1985 | Kanayama et al. |
| 4,539,485 A | 9/1985 | Neuenschwander |
| 4,549,121 A | 10/1985 | Gale |
| 4,575,671 A | 3/1986 | Lee et al. |
| 4,578,609 A | 3/1986 | McCarty |
| 4,581,999 A | 4/1986 | Campagnuolo et al. |
| 4,591,746 A | 5/1986 | Kamiyama |
| 4,605,874 A | 6/1986 | Whiteley |
| 4,598,240 A | 7/1986 | Gale et al. |
| 4,599,551 A | 7/1986 | Wheatley et al. |
| 4,601,354 A | 7/1986 | Campbell et al. |
| 4,628,219 A | 12/1986 | Troscinski |
| 4,630,817 A | 12/1986 | Buckley |
| 4,638,224 A | 1/1987 | Gritter |
| 4,639,647 A | 1/1987 | Posma |
| 4,641,080 A | 2/1987 | Glennon et al. |
| 4,642,031 A | 2/1987 | Farr |
| 4,642,988 A | 2/1987 | Benson |
| 4,644,233 A | 2/1987 | Suzuki |
| 4,654,066 A | 3/1987 | Garcia et al. |
| 4,654,537 A | 3/1987 | Gaspard |
| 4,656,379 A | 4/1987 | McCarty |
| 4,658,166 A | 4/1987 | Oudet |
| 4,658,346 A | 4/1987 | Templeton |
| 4,664,685 A | 5/1987 | Young |
| 4,668,885 A | 5/1987 | Scheller |
| 4,674,199 A | 6/1987 | Lakic |
| 4,675,591 A | 6/1987 | Pleiss |
| 4,678,954 A | 7/1987 | Takeda et al. |
| 4,682,067 A | 7/1987 | Oudet |
| 4,687,945 A | 8/1987 | Ebeling |
| 4,692,675 A | 9/1987 | Falk |
| 4,698,538 A | 10/1987 | Yoshida |
| 4,698,562 A | 10/1987 | Gale et al. |
| 4,710,667 A | 12/1987 | Whiteley |
| 4,713,569 A | 12/1987 | Schwartz |
| 4,729,218 A | 3/1988 | Haselbauer et al. |
| 4,737,070 A | 4/1988 | Horiuchi et al. |
| 4,739,203 A | 4/1988 | Miyao et al. |
| 4,779,038 A | 10/1988 | Eckerfeld |

(56) References Cited

U.S. PATENT DOCUMENTS

| | | |
|---|---|---|
| 4,783,028 A | 11/1988 | Olson |
| 4,783,038 A | 11/1988 | Gilbert et al. |
| 4,785,228 A | 11/1988 | Goddard |
| 4,806,812 A | 2/1989 | Masterman |
| 4,809,510 A | 3/1989 | Gaspard et al. |
| 4,811,091 A | 3/1989 | Morrison et al. |
| 4,814,651 A | 3/1989 | Elris et al. |
| 4,819,361 A | 4/1989 | Boharski |
| 4,831,300 A | 5/1989 | Lindgren |
| 4,835,433 A | 5/1989 | Brown |
| 4,843,270 A | 6/1989 | Dijken |
| 4,845,749 A | 7/1989 | Brickell et al. |
| 4,851,703 A | 7/1989 | Means |
| 4,862,021 A | 8/1989 | Larocca |
| 4,864,151 A | 9/1989 | Wyczalek et al. |
| 4,866,321 A | 9/1989 | Blanchard et al. |
| 4,872,805 A | 10/1989 | Horiuchi et al. |
| 4,874,346 A | 10/1989 | Wachspress |
| 4,876,991 A | 10/1989 | Galitello |
| 4,879,045 A | 11/1989 | Eggerichs |
| 4,879,484 A | 11/1989 | Huss |
| 4,879,501 A | 11/1989 | Haner |
| 4,884,953 A | 12/1989 | Golben |
| 4,885,526 A | 12/1989 | Szabo |
| 4,893,040 A | 1/1990 | Turner et al. |
| 4,904,926 A | 2/1990 | Pasichinskyj |
| 4,906,877 A | 3/1990 | Ciaio |
| 4,914,412 A | 4/1990 | Engdahl et al. |
| 4,927,329 A | 5/1990 | Kliman et al. |
| 4,933,609 A | 6/1990 | Clark |
| 4,948,044 A | 8/1990 | Cacciatore |
| 4,950,973 A | 8/1990 | Kouba |
| 4,953,052 A | 8/1990 | Cartlidge et al. |
| 4,959,605 A | 9/1990 | Vaidya et al. |
| 4,963,780 A | 10/1990 | Hochstrasser |
| 4,973,868 A | 11/1990 | Wust |
| 4,977,529 A | 12/1990 | Gregg et al. |
| 4,980,595 A | 12/1990 | Arora |
| 4,985,875 A | 1/1991 | Mitchell |
| 4,994,700 A | 2/1991 | Bansal et al. |
| 5,002,020 A | 3/1991 | Kos |
| 5,003,209 A | 3/1991 | Huss et al. |
| 5,003,517 A | 3/1991 | Greer |
| 5,021,698 A | 6/1991 | Pullen et al. |
| 5,030,867 A | 7/1991 | Yamada et al. |
| 5,043,592 A | 8/1991 | Hochstrasser |
| 5,043,911 A | 8/1991 | Rashid |
| 5,047,660 A | 9/1991 | Toeroek |
| 5,053,662 A | 10/1991 | Richter |
| 5,057,726 A | 10/1991 | Mole et al. |
| 5,057,731 A | 10/1991 | Hancock |
| 5,058,833 A | 10/1991 | Carmouche |
| 5,065,305 A | 11/1991 | Rich |
| 5,072,145 A | 12/1991 | Davis et al. |
| 5,117,142 A | 5/1992 | Von |
| 5,120,332 A | 6/1992 | Wells |
| 5,130,595 A | 7/1992 | Arora |
| 5,146,146 A * | 9/1992 | Samann ............... H02P 27/026 318/768 |
| 5,155,375 A | 10/1992 | Holley |
| 5,164,826 A | 11/1992 | Dailey |
| 5,174,109 A | 12/1992 | Lampe |
| 5,184,040 A | 2/1993 | Lim |
| 5,184,458 A | 2/1993 | Lampe et al. |
| 5,191,256 A | 3/1993 | Reiter et al. |
| 5,208,498 A | 5/1993 | Hamajima |
| 5,220,223 A | 6/1993 | Mehnert |
| 5,220,232 A | 6/1993 | Rigney et al. |
| 5,237,815 A | 6/1993 | McArthur |
| 5,225,712 A | 7/1993 | Erdman |
| 5,227,702 A | 7/1993 | Nahirney |
| 5,237,817 A | 8/1993 | Bornemisza et al. |
| 5,258,697 A | 11/1993 | Ford et al. |
| 5,267,129 A | 11/1993 | Anderson |
| 5,281,094 A | 1/1994 | McCarty et al. |
| 5,283,488 A | 2/1994 | Ponnappan et al. |
| 5,289,041 A | 2/1994 | Holley |
| 5,289,072 A | 2/1994 | Lange |
| 5,306,972 A | 4/1994 | Hokanson et al. |
| 5,317,498 A | 5/1994 | Dhyandchand et al. |
| 5,336,933 A | 8/1994 | Ernster |
| 5,346,370 A | 9/1994 | Krohn |
| 5,355,044 A | 10/1994 | Uchida et al. |
| 5,369,324 A | 11/1994 | Saether |
| 5,370,112 A | 12/1994 | Perkins |
| 5,371,426 A | 12/1994 | Nagate et al. |
| 5,397,922 A | 3/1995 | Paul et al. |
| 5,400,596 A | 3/1995 | Shlien |
| 5,406,186 A | 4/1995 | Fair |
| 5,409,435 A | 4/1995 | Daniels |
| 5,413,010 A | 5/1995 | Sakakibara et al. |
| 5,427,194 A | 6/1995 | Miller |
| 5,433,175 A | 7/1995 | Hughes et al. |
| 5,448,123 A | 9/1995 | Nilson et al. |
| 5,468,378 A | 11/1995 | De |
| 5,469,045 A | 11/1995 | Dove et al. |
| 5,473,205 A | 12/1995 | Haaland |
| 5,481,146 A | 1/1996 | Davey |
| 5,484,120 A | 1/1996 | Blakeley et al. |
| 5,489,290 A | 2/1996 | Furnish |
| 5,489,810 A | 2/1996 | Ferreira et al. |
| 5,496,238 A | 3/1996 | Taylor |
| 5,504,382 A | 4/1996 | Douglass et al. |
| 5,512,811 A | 4/1996 | Latos et al. |
| 5,517,822 A | 5/1996 | Haws et al. |
| 5,523,635 A | 6/1996 | Ferreira et al. |
| 5,523,637 A | 6/1996 | Miller |
| 5,530,307 A | 6/1996 | Horst |
| 5,568,005 A | 10/1996 | Davidson |
| 5,594,289 A | 1/1997 | Minato |
| 5,610,448 A | 3/1997 | Dattilo |
| 5,614,773 A | 3/1997 | Fabris |
| 5,619,423 A | 4/1997 | Scrantz |
| 5,625,241 A | 4/1997 | Ewing et al. |
| 5,625,276 A | 4/1997 | Scott et al. |
| 5,626,103 A | 5/1997 | Haws et al. |
| 5,637,934 A | 6/1997 | Fabris |
| 5,637,935 A | 6/1997 | Haaland |
| 5,641,276 A | 6/1997 | Heidelberg et al. |
| 5,650,679 A | 7/1997 | Boggs et al. |
| 5,653,135 A | 8/1997 | Miller et al. |
| 5,659,300 A | 8/1997 | Dresselhuys et al. |
| 5,682,073 A | 10/1997 | Mizuno |
| 5,689,165 A | 11/1997 | Jones et al. |
| 5,689,175 A | 11/1997 | Hanson et al. |
| 5,690,209 A | 11/1997 | Kofoed |
| 5,696,413 A | 12/1997 | Woodbridge et al. |
| 5,696,419 A | 12/1997 | Rakestraw et al. |
| 5,699,218 A | 12/1997 | Kadah |
| 5,708,314 A | 1/1998 | Law |
| 5,709,103 A | 1/1998 | Williams |
| 5,710,474 A | 1/1998 | Mulgrave |
| 5,715,716 A | 2/1998 | Miller et al. |
| 5,717,316 A | 2/1998 | Kawai |
| 5,719,458 A | 2/1998 | Kawai |
| 5,720,194 A | 2/1998 | Miller et al. |
| 5,726,517 A | 3/1998 | Gueraud et al. |
| 5,731,649 A | 3/1998 | Caamano |
| 5,735,123 A | 4/1998 | Ehrig |
| 5,736,838 A | 4/1998 | Dove et al. |
| 5,744,896 A | 4/1998 | Kessinger et al. |
| 5,753,989 A | 5/1998 | Syverson et al. |
| 5,760,507 A | 6/1998 | Miller et al. |
| 5,762,584 A | 6/1998 | Daniels |
| 5,773,910 A | 6/1998 | Lange |
| 5,775,229 A | 7/1998 | Folk et al. |
| 5,777,413 A | 7/1998 | Nagata et al. |
| 5,784,267 A | 7/1998 | Koenig et al. |
| 5,785,137 A | 7/1998 | Reuyl |
| 5,793,137 A | 8/1998 | Smith |
| 5,799,484 A | 9/1998 | Nims |
| 5,801,454 A | 9/1998 | Leininger |
| 5,806,959 A | 9/1998 | Adams et al. |
| 5,833,211 A | 11/1998 | Berling |

(56) References Cited

U.S. PATENT DOCUMENTS

| | | |
|---|---|---|
| 5,833,440 A | 11/1998 | Berling |
| 5,838,085 A | 11/1998 | Roesel et al. |
| 5,838,138 A | 11/1998 | Henty |
| 5,839,508 A | 11/1998 | Tubel et al. |
| 5,844,342 A | 12/1998 | Taga et al. |
| 5,844,385 A | 12/1998 | Jones et al. |
| 5,850,111 A | 12/1998 | Haaland |
| 5,850,138 A | 12/1998 | Adams et al. |
| 5,850,732 A | 12/1998 | Willis et al. |
| 5,867,004 A | 2/1999 | Drager et al. |
| 5,874,797 A | 2/1999 | Pinkerton |
| 5,886,450 A | 3/1999 | Kuehnle |
| 5,889,348 A | 3/1999 | Muhlberger et al. |
| 5,892,311 A | 4/1999 | Hayasaka |
| 5,893,343 A | 4/1999 | Rigazzi |
| 5,903,113 A | 5/1999 | Yamada et al. |
| 5,912,522 A | 6/1999 | Rivera |
| 5,923,111 A | 7/1999 | Eno et al. |
| 5,939,813 A | 8/1999 | Schoeb |
| 5,942,829 A | 8/1999 | Huynh |
| 5,945,766 A | 8/1999 | Kim et al. |
| 5,952,756 A | 9/1999 | Hsu et al. |
| 5,968,680 A | 10/1999 | Wolfe et al. |
| 5,973,436 A | 10/1999 | Mitcham |
| 5,982,070 A | 11/1999 | Caamano |
| 5,982,074 A | 11/1999 | Smith et al. |
| 5,990,590 A | 11/1999 | Roesel et al. |
| 5,997,252 A | 12/1999 | Miller |
| 5,998,902 A | 12/1999 | Sleder et al. |
| 6,002,192 A | 12/1999 | Krivospitski et al. |
| 6,005,786 A | 12/1999 | Bluemel et al. |
| 6,014,015 A | 1/2000 | Thorne et al. |
| 6,020,711 A | 2/2000 | Rubertus et al. |
| 6,027,429 A | 2/2000 | Daniels |
| 6,032,459 A | 3/2000 | Skowronski |
| 6,034,463 A | 3/2000 | Hansson |
| 6,037,672 A | 3/2000 | Grewe |
| 6,037,696 A | 3/2000 | Sromin et al. |
| 6,043,579 A | 3/2000 | Hill |
| 6,047,104 A | 4/2000 | Cheng |
| 6,055,163 A | 4/2000 | Wagner et al. |
| 6,057,622 A | 5/2000 | Hsu |
| 6,062,016 A | 5/2000 | Edelman |
| 6,064,122 A | 5/2000 | McConnell |
| 6,065,281 A | 5/2000 | Shekleton et al. |
| 6,066,898 A | 5/2000 | Jensen |
| 6,066,906 A | 5/2000 | Kalsi |
| 6,081,053 A | 6/2000 | Maegawa et al. |
| 6,082,112 A | 7/2000 | Shekleton |
| 6,086,250 A | 7/2000 | Rouhet et al. |
| 6,087,750 A | 7/2000 | Raad |
| 6,093,293 A | 7/2000 | Haag et al. |
| 6,093,986 A | 7/2000 | Windhorn |
| 6,097,104 A | 8/2000 | Russell |
| 6,100,809 A | 8/2000 | Novoselsky et al. |
| 6,104,097 A | 8/2000 | Lehoczky |
| 6,104,115 A | 8/2000 | Offringa et al. |
| 6,105,630 A | 8/2000 | Braun et al. |
| 6,109,222 A | 8/2000 | Glezer et al. |
| 6,125,625 A | 10/2000 | Lipinski et al. |
| 6,127,758 A | 10/2000 | Murry et al. |
| 6,149,410 A | 11/2000 | Cooper |
| 6,157,107 A | 12/2000 | Aoshima et al. |
| 6,158,953 A | 12/2000 | Lamont |
| 6,166,473 A | 12/2000 | Hayasaka |
| 6,169,332 B1 | 1/2001 | Taylor et al. |
| 6,170,251 B1 | 1/2001 | Skowronski et al. |
| 6,172,429 B1 | 1/2001 | Russell |
| 6,172,440 B1 | 1/2001 | Sasaki et al. |
| 6,175,210 B1 | 1/2001 | Schwartz et al. |
| 6,177,735 B1 | 1/2001 | Chapman et al. |
| 6,178,751 B1 | 1/2001 | Shekleton et al. |
| 6,181,235 B1 | 1/2001 | Smith |
| 6,189,621 B1 | 2/2001 | Vail |
| 6,191,561 B1 | 2/2001 | Bartel |
| 6,194,802 B1 | 2/2001 | Rao |
| 6,195,869 B1 | 3/2001 | Pullen et al. |
| 6,198,174 B1 | 3/2001 | Nims et al. |
| 6,199,381 B1 | 3/2001 | Unger et al. |
| 6,199,519 B1 | 3/2001 | Van |
| 6,211,633 B1 | 4/2001 | Jones et al. |
| 6,215,206 B1 | 4/2001 | Chitayat |
| 6,218,760 B1 | 4/2001 | Sakuragi et al. |
| 6,226,990 B1 | 5/2001 | Conrad |
| 6,242,827 B1 | 6/2001 | Wolf et al. |
| 6,242,840 B1 | 6/2001 | Denk et al. |
| 6,244,034 B1 | 6/2001 | Taylor et al. |
| 6,246,138 B1 | 6/2001 | Nims |
| 6,255,743 B1 | 7/2001 | Pinkerton et al. |
| 6,269,639 B1 | 8/2001 | Conrad |
| 6,269,640 B1 | 8/2001 | Conrad |
| 6,274,945 B1 | 8/2001 | Gilbreth et al. |
| 6,274,960 B1 | 8/2001 | Sakai et al. |
| 6,275,012 B1 | 8/2001 | Jabaji |
| 6,276,124 B1 | 8/2001 | Soh et al. |
| 6,279,318 B1 | 8/2001 | Conrad |
| 6,279,319 B1 | 8/2001 | Conrad |
| 6,284,106 B1 | 9/2001 | Haag et al. |
| 6,286,310 B1 | 9/2001 | Conrad |
| 6,288,467 B1 | 9/2001 | Lange et al. |
| 6,291,901 B1 | 9/2001 | Cefo |
| 6,293,101 B1 | 9/2001 | Conrad |
| 6,294,842 B1 | 9/2001 | Skowronski |
| 6,297,977 B1 | 10/2001 | Huggett et al. |
| 6,300,689 B1 | 10/2001 | Smalser |
| 6,307,278 B1 | 10/2001 | Nims et al. |
| 6,307,717 B1 | 10/2001 | Jeong |
| 6,309,268 B1 | 10/2001 | Mabru |
| 6,311,490 B1 | 11/2001 | Conrad |
| 6,311,491 B1 | 11/2001 | Conrad |
| 6,314,773 B1 | 11/2001 | Miller et al. |
| 6,332,319 B1 | 12/2001 | Conrad |
| 6,336,326 B1 | 1/2002 | Conrad |
| 6,339,271 B1 | 1/2002 | Noble et al. |
| 6,345,666 B1 | 2/2002 | Conrad |
| 6,348,683 B1 | 2/2002 | Verghese et al. |
| 6,362,718 B1 | 3/2002 | Patrick et al. |
| 6,363,706 B1 | 4/2002 | Meister et al. |
| 6,370,928 B1 | 4/2002 | Chies et al. |
| 6,373,162 B1 | 4/2002 | Liang et al. |
| 6,373,230 B2 | 4/2002 | Jabaji |
| 6,380,648 B1 | 4/2002 | Hsu |
| 6,384,564 B1 | 5/2002 | Pollock |
| 6,397,946 B1 | 6/2002 | Vail |
| 6,405,522 B1 | 6/2002 | Pont et al. |
| 6,407,465 B1 | 6/2002 | Peltz et al. |
| 6,411,003 B1 | 6/2002 | Sasaki et al. |
| 6,435,925 B1 | 8/2002 | Mabru |
| 6,438,937 B1 | 8/2002 | Pont et al. |
| 6,445,105 B1 | 9/2002 | Kliman et al. |
| 6,453,658 B1 | 9/2002 | Willis et al. |
| 6,454,920 B1 | 9/2002 | Haag et al. |
| 6,455,964 B1 | 9/2002 | Nims |
| 6,455,970 B1 | 9/2002 | Shaefer et al. |
| 6,463,730 B1 | 10/2002 | Keller et al. |
| 6,467,725 B1 | 10/2002 | Coles et al. |
| 6,470,933 B1 | 10/2002 | Volpi |
| 6,479,534 B1 | 11/2002 | Bentley et al. |
| 6,483,222 B2 | 11/2002 | Pelrine et al. |
| 6,486,640 B2 | 11/2002 | Adams |
| 6,501,195 B1 | 12/2002 | Barton |
| 6,503,056 B2 | 1/2003 | Eccles et al. |
| 6,504,281 B1 | 1/2003 | Smith et al. |
| 6,512,305 B1 | 1/2003 | Pinkerton et al. |
| 6,518,680 B2 | 2/2003 | McDavid |
| 6,526,757 B2 | 3/2003 | MacKay |
| 6,528,902 B1 | 3/2003 | Barton |
| 6,531,799 B1 | 3/2003 | Miller |
| 6,538,358 B1 | 3/2003 | Krefta et al. |
| 6,541,887 B2 | 4/2003 | Kawamura |
| 6,545,373 B1 | 4/2003 | Andres et al. |
| 6,546,769 B2 | 4/2003 | Miller et al. |
| 6,548,925 B2 | 4/2003 | Noble et al. |
| 6,563,717 B2 | 5/2003 | Lunding et al. |

(56) References Cited

U.S. PATENT DOCUMENTS

| | | | |
|---|---|---|---|
| 6,565,243 B1 | 5/2003 | Cheung |
| 6,566,764 B2 | 5/2003 | Rebsdorf et al. |
| 6,579,137 B2 | 6/2003 | Mabru |
| 6,590,298 B1 | 7/2003 | Du |
| 6,606,864 B2 | 8/2003 | MacKay |
| 6,622,487 B2 | 9/2003 | Jones |
| 6,631,080 B2 | 10/2003 | Trimble et al. |
| 6,634,176 B2 | 10/2003 | Rouse et al. |
| 6,644,027 B1 | 11/2003 | Kelly |
| 6,647,716 B2 | 11/2003 | Boyd |
| 6,655,341 B2 | 12/2003 | Westerbeke |
| 6,657,348 B2 | 12/2003 | Qin et al. |
| 6,664,688 B2 | 12/2003 | Naito et al. |
| 6,666,027 B1 | 12/2003 | Cardenas |
| 6,669,416 B2 | 12/2003 | Klement |
| 6,672,413 B2 | 1/2004 | Moore et al. |
| 6,675,583 B2 | 1/2004 | Willis et al. |
| 6,677,685 B2 | 1/2004 | Pfleger et al. |
| 6,679,977 B2 | 1/2004 | Haag et al. |
| 6,684,642 B2 | 2/2004 | Willis et al. |
| 6,700,217 B1 | 3/2004 | North et al. |
| 6,700,248 B2 | 3/2004 | Long |
| 6,702,404 B2 | 3/2004 | Anwar et al. |
| 6,703,719 B1 | 3/2004 | McConnell |
| 6,703,747 B2 | 3/2004 | Kawamura |
| 6,710,469 B2 | 3/2004 | McDavid |
| 6,710,491 B2 | 3/2004 | Wu et al. |
| 6,710,492 B2 | 3/2004 | Minagawa |
| 6,710,502 B2 | 3/2004 | Maslov et al. |
| 6,713,936 B2 | 3/2004 | Lee |
| 6,717,313 B1 | 4/2004 | Bae |
| 6,720,688 B1 | 4/2004 | Schiller |
| 6,724,115 B2 | 4/2004 | Kusase |
| 6,727,632 B2 | 4/2004 | Kusase |
| 6,731,019 B2 | 5/2004 | Burns et al. |
| 6,732,531 B2 | 5/2004 | Dickey |
| 6,735,953 B1 | 5/2004 | Wolfe et al. |
| 6,737,829 B2 | 5/2004 | Sastry |
| 6,741,010 B2 | 5/2004 | Wilkin |
| 6,756,719 B1 | 6/2004 | Chiu |
| 6,759,775 B2 | 7/2004 | Grimm |
| 6,765,307 B2 | 7/2004 | Gerber et al. |
| 6,766,647 B2 | 7/2004 | Hartzheim |
| 6,771,000 B2 | 8/2004 | Kim et al. |
| 6,803,696 B2 | 10/2004 | Chen |
| 6,894,455 B2 | 5/2005 | Cai et al. |
| 6,897,595 B1 | 5/2005 | Chiarenza |
| 6,969,927 B1 | 11/2005 | Lee |
| 7,002,259 B2 | 2/2006 | Howes et al. |
| 7,081,696 B2 | 7/2006 | Ritchey |
| 7,102,248 B2 | 9/2006 | Wobben |
| 7,250,702 B2 | 7/2007 | Abou et al. |
| 7,348,764 B2 | 3/2008 | Stewart et al. |
| 7,400,077 B2 | 7/2008 | Caroon |
| 7,405,490 B2 | 7/2008 | Moehlenkamp |
| 7,482,708 B1 | 1/2009 | Barton et al. |
| 7,514,834 B2 | 4/2009 | Takeuchi |
| 7,545,052 B2 | 6/2009 | Llorente et al. |
| 7,554,303 B1 | 6/2009 | Kawamura |
| 7,595,574 B2 | 9/2009 | Ritchey |
| 7,602,158 B1 | 10/2009 | Iacob |
| 7,649,274 B2 | 1/2010 | Burt |
| 7,710,081 B2 | 5/2010 | Saban et al. |
| 8,097,970 B2 | 1/2012 | Hyvaerinen |
| 8,106,563 B2 | 1/2012 | Ritchey |
| 8,138,620 B2 | 3/2012 | Wagoner et al. |
| 8,212,371 B2 | 7/2012 | Maibach et al. |
| 8,212,445 B2 | 7/2012 | Ritchey |
| 8,466,595 B2 | 6/2013 | Spooner |
| 8,614,529 B2 | 12/2013 | Ritchey |
| 8,917,155 B2 * | 12/2014 | Adachi ............... H01F 27/36 |
| | | 336/84 R |
| 9,230,730 B2 | 1/2016 | Heins |
| 9,812,981 B2 * | 11/2017 | Ritchey ............... H02P 9/02 |
| 10,103,591 B2 | 10/2018 | Heins |
| 10,291,162 B1 | 5/2019 | Heins |
| 2002/0012261 A1 | 1/2002 | Moindron |
| 2002/0047418 A1 | 4/2002 | Seguchi et al. |
| 2002/0057030 A1 | 5/2002 | Fogarty |
| 2004/0037221 A1 | 2/2004 | Aisa |
| 2004/0174652 A1 | 9/2004 | Lewis |
| 2004/0232796 A1 | 11/2004 | Weissensteiner |
| 2004/0251761 A1 | 12/2004 | Hirzel |
| 2005/0013085 A1 | 1/2005 | Kinsella et al. |
| 2005/0099314 A1 | 5/2005 | Aisa |
| 2005/0248440 A1 | 11/2005 | Stevens |
| 2005/0280264 A1 | 12/2005 | Nagy |
| 2006/0056127 A1 | 3/2006 | Lewis |
| 2006/0273766 A1 | 12/2006 | Kawamura |
| 2007/0182273 A1 | 8/2007 | Burt |
| 2008/0012538 A1 | 1/2008 | Stewart et al. |
| 2008/0088200 A1 | 4/2008 | Ritchey |
| 2008/0106100 A1 | 5/2008 | Hyvarinen |
| 2008/0116759 A1 | 5/2008 | Lin |
| 2008/0266742 A1 | 10/2008 | Henke et al. |
| 2009/0267414 A1 | 10/2009 | Kiyohara et al. |
| 2010/0019593 A1 | 1/2010 | Ritchey |
| 2010/0073970 A1 | 3/2010 | Abolhassani et al. |
| 2010/0090553 A1 | 4/2010 | Ritchey |
| 2011/0241630 A1 | 10/2011 | Ritchey et al. |
| 2011/0266806 A1 | 11/2011 | Numajiri |
| 2012/0194403 A1 | 8/2012 | Cordier et al. |
| 2012/0229060 A1 | 9/2012 | Ritchey et al. |
| 2014/0167708 A1 | 6/2014 | Ritchey |
| 2014/0252922 A1 | 9/2014 | Ritchey et al. |
| 2014/0253271 A1 | 9/2014 | Heins |
| 2018/0019694 A1 | 1/2018 | Spickard |
| 2018/0278146 A1 | 9/2018 | Guven et al. |

FOREIGN PATENT DOCUMENTS

| | | |
|---|---|---|
| CN | 1082740 C | 4/2002 |
| CN | 101582672 A | 11/2009 |
| DE | 19733208 C1 | 10/1998 |
| EP | 1416604 A2 | 5/2004 |
| EP | 1717946 A2 | 11/2006 |
| EP | 1068663 B1 | 5/2008 |
| JP | 2001161098 A | 6/2001 |
| JP | 2001204198 A | 7/2001 |
| JP | 5798015 B2 | 8/2015 |
| KR | 1020070082819 | 8/2007 |
| WO | 8100651 A1 | 3/1981 |
| WO | 8807782 A1 | 10/1988 |
| WO | 9806291 A1 | 2/1998 |
| WO | 2007098227 A2 | 8/2007 |
| WO | 2008067649 A2 | 6/2008 |
| WO | 2008091035 A1 | 7/2008 |
| WO | 2008119864 A1 | 10/2008 |
| WO | 2013155601 A1 | 10/2013 |
| WO | 2018213919 A1 | 11/2018 |

OTHER PUBLICATIONS

Canadian Examination Report, dated Nov. 1, 2017, for CA 2,773,040, 4 pages.
Canadian Office Action, for Canadian Application No. 2,487,668, dated Oct. 6, 2011, 4 pages.
European Examination Report, dated Apr. 18, 2017, for EP 10 814 529.3, 6 pages.
First Office Action and Search Report (with English Translation) from corresponding CN application No. 201080039251.0, dated Jan. 30, 2014, 16 pages.
International Preliminary Report on Patentability and Written Opinion, dated Mar. 6, 2012, for PCT/US2010/047750, 5 pages.
International Preliminary Report on Patentability with Written Opinion dated Nov. 26, 2019, for International Application No. PCT/CA2018/050222, filed Feb. 27, 2018, 6 pages.
International Search Report and Written Opinion, dated May 24, 2011, for PCT/US2010/047750, 7 pages.
International Search Report and Written Opinion, dated May 8, 2018, for PCT/CA2018/050222, 8 pages.

(56) References Cited

OTHER PUBLICATIONS

International Search Report and Written Opinion, dated Sep. 28, 2007, for PCT/CA2007/001040, 8 pages.
Extended European Search Report, dated Oct. 14, 2020, for EP 18806122, 7 pages.
International Search Report and Written Opinion, dated Jun. 2, 2020, for PCT/CA2020/050534, 10 pages.
International Search Report and Written Opinion, dated Nov. 13, 2019, for PCT/CA2019/051239, 9 pages.
Villani M., et al., "Fault-tolerant brushless DC drive for aerospace application. In the XIX International Conference on Electrical Machines—ICEM Sep. 6, 2010", 1-7.

* cited by examiner

| SW \ POS | 0 DEG<br>DBI-WYE | 60 DEG<br>STG-SM-WYE | 120 DEG<br>DBI-DELTA | 180 DEG<br>SGT SMDELTA | 240 DEG<br>BIG-WYE | 300 DEG<br>BIG-WYE |
|---|---|---|---|---|---|---|
| R1 4-1 | | | | | ■ | ■ |
| R2 5-8 | | | | | ■ | ■ |
| R3 6-9 | | | | | ■ | |
| R4A 10-11 | ■ | | | | ■ | |
| R4B 11-12 | ■ | | | | ■ | |
| R5 1-12 | | | | | | ■ L1 |
| R6 2-10 | | | | | | ■ L2 |
| R7 3-11 | | | | | | ■ L3 |
| R8 1-7 | ■ L1 | | | | | |
| R9A 4-5 | ■ | ■ | | | | |
| R9B 5-6 | ■ | ■ | | | | |
| R10 3-9 | ■ L3 | | | | | |
| R11 2-8 | ■ L2 | | | | | |
| R13A 1-6 | | | ■ L1 | ■ L1 | | |
| R13B 6-7 | | | ■ L1 | | | |
| R13C 7-12 | | | ■ L1 | | | |
| R14A 2-4 | | | ■ L2 | ■ L2 | | |
| R14B 4-8 | | | ■ L2 | | | |
| R14C 8-10 | | | ■ L2 | | | |
| R15A 3-5 | | | ■ L3 | ■ L3 | | |
| R15B 5-9 | | | ■ L3 | | | |
| R15C 9-11 | | | ■ L3 | | | |
| | | | | | | |
| R12 | | | | | | |
| OUT L1 WIRE 1 | ■ | ■ | ■ | ■ | ■ | ■ |
| OUT L2 WIRE 2 | ■ | ■ | ■ | ■ | ■ | ■ |
| OUT L3 WIRE 3 | ■ | ■ | ■ | ■ | ■ | ■ |

VARIABLE COIL CONFIGURATION SYSTEM CONTROL, APPARATUS AND METHOD

TECHNICAL FIELD

The present application is directed to rotating electric machines, for example, an electric generator, electric motor, or regenerative motor.

BACKGROUND

Description of the Related Art

Electric machines such as electric motors and electric generators are typically limited to a single speed torque characteristic, which results from the electric machine having a static, hardwired, coil configuration. A hardwired machine winding is only able to provide certain functions that result from that specific winding condition. This limitation may not be a problem for single speed applications. However, for variable speed applications it may be highly desirable to have an alternate winding configuration that is not available with traditional electric machines.

Existing electric machine designs have attempted to create greater control, typically by using complicated and expensive power electronics that introduce additional losses in efficiency to the overall system. One such system is a Variable Frequency Drive, which improves efficiency but still introduces losses that rapidly increase at approximately 50% of full load. While numerous approaches to optimizing the operation of electric machine exist, most focus on pre- and post-machine electrical operations, accepting the limitations inherent in conventional electric machines.

BRIEF SUMMARY

The present application generally relates to rotating electric machines, and more specifically to electric generators, electric motors, or regenerative motors that are highly efficient and have improved performance characteristic that result from a control system that changes the configuration of the stator and/or armature coils or windings in real time and under loaded conditions. The proposed technology is a unique new electromagnetic (EM) technology platform, operable as either an electric motor or electric generator, or both, for example, in applications such as regenerative braking. The electric machine operates at essentially the same efficiency and has the same performance capabilities as other electric machines at a rated design point, but has lower losses when operating away from the specific design point of the electric machine. One benefit of this technology is that it provides a more efficient electric machine with improved performance characteristics over a relative large range of operating conditions. This improvement in efficiency and performance may also have significant benefits with respect to other system elements. For example, this technology may reduce the need for or simplify mechanical systems such as gearboxes, as well as electrical components, such as boost converters.

The electromagnetic (EM) technology platform may include an optimized switching system and an intelligent controller, driven by application specific control algorithms. The electromagnetic (EM) technology platform utilizes a uniquely designed control architecture that adapts to existing electric motors and electric generators, allowing them to operate as a multitude of different machines in real time, and under load.

Traditional hardwired machines operate at highest efficiency at a single speed, which works fine for stable applications, but introduces significant losses in highly variable applications (e.g., renewable energy turbines, carbon fueled generators, electric vehicles, industrial motors). The EM technology platform described herein changes the underlying paradigm by altering the electromagnetics of the electric machine in response to changes in speed and, or torque.

The intelligent switching interface reconfigures coil windings in a multitude of series and parallel combinations, that effectively changes the optimal operating point of the electric machine. The specific geometry of the electric machine is therefore continually optimized to reduce core, copper, and mechanical losses, while providing more flexible and capable speed torque characteristics.

The dynamically configured electric machine will function as though it were multiple different electric machines, while selecting efficiency or a specific speed torque output characteristic. This is accomplished because the speed of the rotating electric machine is a function of applied voltage, and torque is a product of current. The ability to control these electrical properties provides a unique ability to optimize electric machine parameters beyond existing technologies, and without complex and expensive power electronics and the resulting losses.

The switching control system reconfigures the electric machine windings in real or almost real time, and under loaded conditions. The switching control system integrates directly into existing rotating electric machines, and can be adapted to work with any number of electric machine designs. Only minor modifications to the machine windings are required to implement the switching control technology.

The apparatus and methods described herein may be utilized in many forms providing benefits for electric power generation, electric motor drive applications, and full four quadrant operations needed for applications such as electric vehicles.

When configured for traction electric motor applications, the switching control system optimizes both the electric machine's relative output and its circuitry in a way that is more efficient through the full range of braking (as a generator) and accelerating (as a motor). This reconfiguration approach is ideal for operating electric vehicles, which need to shift very quickly in real time. Currently, many electric vehicles are limited by their inability to shift quickly in a range of rotational velocities (RPMs), leaving their electric motors efficient in only a relatively narrow band. The unique switching technology described herein allows for more efficient capture and conversion of electrical energy into torque through a wide range of rotational velocities.

The switching control system is an augmentation to the existing control power electronics, and may be situated between the existing rotating electric machine and the associated power electronics. It provides many configurations without redundant coils (e.g., without secondary windings that increase cost and weight) to modify the coil or winding configuration. Using the existing coils or windings, a controller of the switching control system dynamically assesses the torque and rotational velocity (RPM) at a shaft, and then uses a unique switching topology to reconfigure the electric machine in real-time to optimize the configuration. This reduces losses and ensures the desired output characteristics. In other words, where other systems are hardwired for one specific operating point, a coil switching enabled electric machine is able to self-optimize by modifying an internal configuration of the electric machine on the fly or dynamically.

In generator mode, the conversion of mechanical energy is optimized through a broader range of efficient operation. In motor mode, the disclosed machine control will provide alternate speed torque curves that provide a more optimized output at given speeds than otherwise achievable.

The ability to control the electrical and mechanical characteristics of the electric machine provides a level of control that can reduce or remove the need for other typical system components, such as gears, pulleys, and hydraulics that are traditionally employed to compensate for inefficiencies of conventional electric machines.

Embodiments of the present system and method include a variable configuration controller system and method to connect multiple machine coil windings in varying series or parallel combination. In addition, the embodiments of the present system and method offer the ability to switch between Wye and Delta combinations, and may utilize the stator and/or the rotor windings of a given type of machine and desired operation.

The technology is designed to offer an optimized condition for electric machine operations that can adapt with the changes in the current circumstances that influence operation and capabilities of an electric machine. The range of complexity and capability will depend upon the specific application and desired function. A simple form of the switch device, which may be advisable for some applications, can implement a selection between two switching configurations, along with an ability to convert a collective output between either Wye to Delta configurations. Additional coil switching options will require additional hardware, but will provide for additional electric machine configurations.

The technology can be applied to a wide variety of electric machine designs as long as there is an adequate number of inductor coils in the rotating electric machine. This means that the technology may be applied to a traditional induction machine, AC and DC electric machines of all kinds, permanent magnet (PM) or field excited electric machines, brushed or brushless electric machines, may include sensors or be sensor-less electric machines, and, or synchronous or asynchronous electric machines.

All of these electric machine designs are limited in their ability to convert mechanical to electrical energy, or electrical to mechanical energy with high efficiencies over a broad range of operation. Expensive and costly power electronics are often the only conventional solution. In addition, downstream components, such as a rectifier and inverter are impacted with respect to their efficiencies, given certain operating conditions that cannot normally be controlled under conventional approaches.

For most electric machine types there are numerous control methods that may be employed and most are appropriate for the disclosed switching control system, including frequency/voltage—f/V ratio control systems, 6 step inverters, pulse width modulated (PWM) inverters, Space Vector, Field Oriented Control (FOC), etc. Many of these designs have options that may play a role in determining the best way to integrate the technology given certain circumstances and desired outcomes. As an example, the FOC systems may be sensorless, or may use encoders, Hall effect sensors, or other components with feedback loops to assist in the control of the system. While the technology may be applied to many electric machine designs, the preferred embodiment is the implementation of the technology into a Permanent Magnet Synchronous Machine (PMSM) using a sensorless Field Oriented Control topology.

The optimization of the electric machine through electric machine reconfiguration technology offers benefits beyond reducing losses in the electrical machine itself. As a generator, the output signal created by a controller may provide a more optimized signal into existing power electronics, and thus positively impact the losses that occur in those components. As an example, inverters have the greatest efficiency when operated at their design or rated condition. As the electric machine drifts away from the specified optimal range, the capabilities of the inverter are reduced.

The machine coil switching system may include the ability to engage or disengage one or more coils, either as individual coils, or as groups of coils that may be hardwired together. This in effect can "right size" the particular electric machine for a given operating condition, to improve the overall performance characteristics of the electric machine. This can be accomplished along with the coil reconfiguration, such that the electric machine is both appropriately sized with induction capacity, as well as optimally configured, and can continue to adapt given changing operating conditions.

A further benefit of the technology is to provide a level of fault tolerance that is not possible with traditional designs. As the electric machine will be wired in such a way as to have divided the coils into a number of independent coils or coil combinations or groups, the ability to disengage one or multiple coils is possible. One may disengage a single coil or multiple coils. Should the electric machine become imbalanced mechanically or electrically due to a coil's removal, it may be advisable to remove coils symmetrically so as to maintain a balanced system. This will allow the electric machine to disconnect compromised coils while allowing the electric machine to continue to operate where a conventional electric machine could not.

Coil switching is best done through a direct integration into the existing control system, but can be accomplished as an independent system upstream of the existing power electronics, if desired. The switches can be any number of mechanical or semiconductor based switches (e.g., TRIACs, IGBTs, FETs, SSRs). An undesirable number of semiconductors may be required to switch machines with many coils due to the semiconductor losses. In this case, an embodiment is disclosed that utilizes mechanical contacts that are not subject to the same losses. Additionally, a simplified design may reduce part count, cost, and complexity, and an apparatus for switching is disclosed in this application.

Coil configuration changes ideally may be performed at the zero crossing in order to avoid undesirable effects such as various transients, notably, voltage and current spikes that may otherwise result. While low power systems may not require the zero cross switch timing, high power applications will strongly benefit by such. Depending upon the particular system, various approaches may rectify this concern, including timing of the switching event, which is a preferred approach, and/or utilization of snubber circuitry to suppress transients.

Implementation of the technology will be determined based on the type of electric machine, the type of control system, or by the combination of the two along with the desired capabilities of the switch enabled electric machines.

In addition to the efficiency benefits of the electric machine itself, and the optimized torque speed characteristics, there are numerous other benefits the described technology provides.

BRIEF SUMMARY

The apparatus and methods described here may allow an electric machine to be wound with a finer wire than might otherwise be required, providing more wire per tooth, while still allowing high current operations via selection of a parallel winding configuration when required or beneficial. This approach allows for parallel winding configurations for higher current operation, and series configurations for more ampere-turns using a smaller gauge wire.

Core losses can be minimized by operating the electric machine as a generator at relatively slower speeds, while the output voltage is maintained by switching to a series coil configuration. Coil-switching enabled electric machines can produce desired voltages at lower speeds as compared to fixed winding electric machines. Loss elements including hysteresis losses and eddy currents (core losses) can be advantageously reduced.

Conventional electric machine performance of a static winding machine is impaired because reactance and other AC effects are fixed functions of speed and load. Winding inductance and frequency (speed) affect the impedance of a rotating electric machine, so reconfiguring the windings allows tuning of the impedance of the electric machine according to the actual operating conditions, for instance dynamically as determined in real or almost real time. Switching enabled electric machines have source voltage regulation, providing a desired or specified output across a relative wide range of speeds.

The coils-switched winding reconfiguration can maintain a high output voltage at relatively lower speeds than conventional electric machines, particularly in electric machines where rotor windage is a significant contributor to losses. In high speed electric machines, windage is the single biggest contributor to losses associated with the electric machine. The described electric machine(s) allows for slower speed operations, while producing the desired or specified voltage, resulting in increased efficiency and potentially reduced maintenance and repair.

Immediate fault detection and coil isolation may be incorporated to allow operation to continue in a degraded mode until the electric machine is repaired/replaced. Windings are a single point of failure in fixed winding electric machines.

By switching coil configurations to hold an output voltage of an electric machine operating as a generator within a limited range, buck/boost converters may be eliminated or simplified, independent of generator speed. Converters may be required to boost (increase) or buck (decrease) signal characteristics when system voltages and currents fall outside the required or specified range. Coil switch enabled electric machines achieve source voltage regulation by reconfiguring the windings, providing a desired or specified output across a relatively wide range of speeds. Similarly, the technology may allow for a reduction in complexity or the elimination of a gearbox.

The fixed voltage drop of rectifiers is held to a small fraction of the generator output by switching to a series configuration with higher rectifier input voltage at slow speed, minimizing rectifier losses.

Output voltage control allows control of speed, and therefore inductance, frequency, reactance and impedance, which improves power transfer when matched to the load. Efficient transfer of power from source to load relies on circuit impedance matching within the system.

An impedance mismatch between source and load can compromise power transfer to the load. The switching control system provides a primary source impedance control to work with the existing set of tools for impedance matching.

The disclosed switching control system is particularly beneficial when applied to electric and hybrid vehicles. It is also beneficial in other variable applications where a battery or other power storage device (e.g., supercapacitor) is charged. The switching technology is able to provide application specific advantages to assist in more optimal charging operations.

The switching control system provides charge optimization and may be used to charge batteries or other power storage devices as part of a four quadrant primary motor and/or it may be applied to a generator only. Where a specific voltage is required to be in excess of the battery voltage for charging, electric machine conditions may not provide enough voltage for this charging state. When a high voltage winding is needed, the electric machine will transition more of the coils to a series configuration, and where low voltage is needed, more coils are switched in parallel. This ability to maintain voltage will optimize charging without voltage converters or regulators.

While there is a material shift in electric machine design towards multiple coils in stator architectures, there are still many electric machines that have only a few stator windings. To create an opportunity to accomplish coil switching for these electric machines, the windings on the stator teeth may be divided into multiple separate coil windings. The multiple coils can be arranged any number of ways. For example, for a concentrated winding architecture, the windings may be layered or separated with a wire tapped off the middle of the coil, similar to a center taped transformer coil. In at least one implementation, the center tapped type coil can be used in such a way as to accommodate more efficient rectification. As is done with transformer applications, the individual tooth or teeth windings may require only two diodes for passive rectification, rather than four. This in effect will reduce the diode drop by 50%, while still allowing full-wave rectification of the signal.

Equalization control is the modification of the input properties to maintain proper operations for the electric machine as the electric machine switches from one configuration to another. With some types of electric machine speed is controlled by frequency, while other types of electric machines are controlled by other variables, for instance voltage.

With abrupt coil switching, the switching control system may compensate for each of the switching events and the implications of the events on the electrical and mechanical properties of the system. For example, as a switching event is carried out, a material change in the electric machine windings may result, and could cause a significant shift in the voltage and current properties. Those properties play roles in how the electrical energy translates into mechanical energy depending upon the type of electric machine and switching control system employed. As an example, there may be a material shift in a resultant torque and speed profile of the electric machine. In certain applications, the rotational speed and torque must be maintained and ideally, optimized for the current operating condition. As a result various approaches to compensate for those changes may be employed.

Each configuration circuit can have built in electrical elements to assist in the optimization of the system and may include the addition of the appropriate amount of capacitance given the configuration, as well as suppression systems such as snubbers to control system transients. It may also be beneficial to apply appropriate shunt resistance to maintain optimal power transfer to the load given certain operating conditions.

An example, of where the switching event may cause a problem is in one of the most basic types of PMSM drives called a constant voltage frequency ratio drive. With this type of system, the voltage frequency ratio is maintained by controller. Any significant and sudden increase in the mechanical load applied to the PMSM in a constant voltage ratio system can cause the rotor to pull out of synchronization. This is due to the lack of control over the torque produced by the PMSM in a constant voltage frequency ratio PMSM drive. Consequently, it cannot be adjusted as required when the mechanical load applied to the PMSM varies suddenly, thereby causing the rotor to pull out of synchronization.

Similarly, rather than the load changes causing the pull out of synchronization, the electrical and thus mechanical shift from a switching event may also cause a loss of synchronization. One way to avoid this unwanted effect is to employ a controlled voltage regulator that switches the inputs to accommodate the current situation (current coil configuration). Another way to accomplish this is to use a buck or boost converter that brings the signal characteristics to an optimal state with a coil configuration change.

While many control systems may be employed with the disclosed switching apparatus, the preferred embodiment utilizes space vector Field Oriented Control, primarily the space.

Vector FOC control is designed such that the synchronous relationship between the rotor flux and the stator magnet flux (assuming a PM machine) will not be lost with a sudden shift in inverter frequency. When the speed command parameter of the vector control PMSM drive suddenly increases from 2400 to 4800 r/min, the rotation speed of the PMSM increases rapidly from 2400 to 4800 r/m in. Incorporating a coil switching system with these systems may augment the operational capabilities of an electric machine, and may further benefit the FOC control. Minor modifications to the FOC may be required for optimal coil switch transitions.

Control modifications may optimize the integration of the switching technology into vector FOC system through the existing speed command control. The speed command feedback control loop is designed to maintain desired speed while maintaining maximum torque. This is accomplished by ensuring the stator magnetic field always leads the rotor magnetic field by 90° when the PMSM operates as an electric motor. This can be accomplished despite variations in mechanical load.

Upon a coil switching event, the currents may exceed desired limits however elements of the vector FOC can accommodate the coil transition. The speed error produced by the speed feedback control loop is passed through a limiter before being used as the command of the current feedback control loop. This limits the maximum value of current from the current command and thus the maximum torque which the PMSM is allowed to produce. The control algorithm must be accurate and accommodate these changes to ensure ideal operations for a switching event.

With other control systems, the capabilities of the controller may not be as well suited to accommodate a switching event. Other approaches can be employed if the coil switching events causes a sudden perturbation in torque on the shaft that is undesirable for the application. In order to soften the mechanical impact of a coil switching event on the system, a simple control method may be employed. Rather than all coils from all stages being reconfigured at the same time, creating the maximal torque change on the shaft (considering a rotating machine), coils can be transitioned over time. This can be accomplished with various coils or coil groupings in a single or multiple phase system being engaged at different times, or it may be accomplished using separate machine phases as the coil groupings.

In a three phase electric machine, the timing of the transition of the phases may be offset such that each phase of coils transitions to the new configuration at a slightly different time. The electrical offset will in turn create a mechanical offset that divides the collective torque transition over time into one third segments.

For example, after the first phase shifts to the new configuration, the next phase may not engage for 200 ms, and then once that phase has switched, the final phase may engage 200 ms after that. In this scenario, the entire coil reconfiguration of the three phases takes place over less than a half a second, however the torque transition is softened allowing the mechanical elements time to absorb the torque and smooth the transition placing less mechanical stress on the system.

Another approach that allows for the smooth transition from one configuration to another is the implementation of a pulse width modulation (PWM) system that can be used with or without the stepped phase changes. This would transition the electrical properties over some short period of time (such as a ramp cycle), allowing the electrical and mechanical changes to be absorbed by the system without a sudden pronounced force event.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 3A is a table showing a number of electrical switching schemes that can be realized or implemented via the electric machine system of FIG. 1, employing a motorized positioner, according to at least one illustrated implementation.

DETAILED DESCRIPTION

Figure 1:
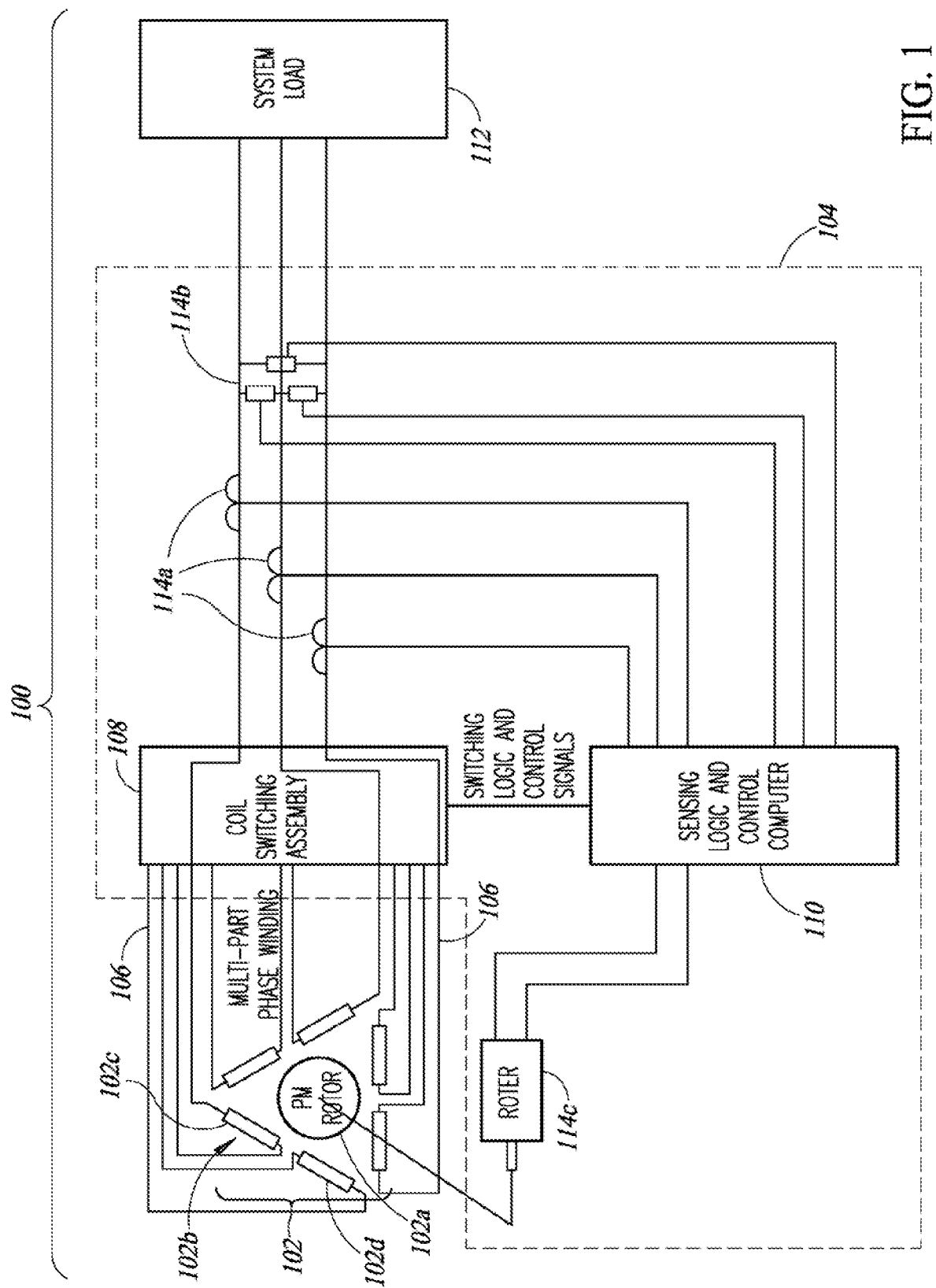
FIG. 1 is a schematic diagram of an electric machine system that includes an electric machine and a coil switching system, according to at least one illustrated implementation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electric machines, power electronics, and communications, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment," means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

Analysis of the simplest approach to reconfigure coils showed that even with only two coils per phase on the stator (or two coil groupings), every stator conductor is switched at least once as the various coil combinations are exercised.

Alternate switching configurations may be utilized to transition from one coil configuration to another coil configuration that minimizes the number of switches required, with several modalities discussed herein. The preferred embodiment integrates the switching scheme to incorporate both i) coils switching from the phases and ii) the ability to transition from a Wye configuration to a Delta configuration.

Any switching element must operate successfully at the current and voltage levels experienced as the electric machine operates. This will vary according to the electrical capacity of the electric machine. For some electric machines, it may be desirable to use mechanical contacts to make the required connections between coils. Thus, a shaft driven, cam operated switching arrangement (sometimes described as a drum controller) can advantageously be employed. An advantage of such an implementation is a low amount of lost energy, as losses through metal-metal contacts can be small.

A typical loss for a total of 20 contacts dropping 100 mV each at a load of 10 amperes would be in the order of 20 Watts. It is noted that it is unlikely the maximum number of switching elements would be all ON at a given time.

Larger electric machines might require larger power handling capability in which case a coil switcher employing relays would be appropriate. Losses may be higher due to both the contact resistance and the energy used to energize the relay coils. A typical scenario might include 20 contacts dropping 100 mV each at a load of 20 amperes (40 Watts) plus the energized coils of 100 mA at an operating voltage of 24 V (48 Watts) for a total dissipation of 88 Watts. It is again noted that it is unlikely the maximum number of switching elements would be all ON at a given time.

A third alternative is an arrangement of solid-state switches controlled by a processor (e.g., computer, microprocessor, microcontroller, application specific integrated circuit, programmable logic controller, field programmable gate array). This may be more technically challenging as some devices will require high-side gate drive due to their position electrically in the switcher. An advantage may be gained in their reliability and silent operation. Projected losses for a 20 thyristor switch each carrying 20 amperes with a junction voltage drop of 700 mV would be 280 Watts. Again, typically not all elements would be ON at a given time.

For simplicity of illustration, switching elements are generally shown as single-pole, single throw (SPST) despite the need for multiple contacts in some switching positions. It can be seen that some switches (R4 or R9 for example) have multiple single pole sections to give the required number of contacts to achieve the needed switching. In practice, an equivalent multipole relay or switch could be used.

Switching from one coil configuration to another coil configuration may be carried out as "open-transition," or as "closed transition." Open transition assumes that as the change is made from one coil configuration to another coil configuration, the coil switching system provides a brief period when the output to the load is interrupted. This is a common practice in the case of Wye-Delta starting in AC machines, particularly 3 phase motors. Real-time detection of zero-crossing of the phase currents can minimize the pause in switching and thereby minimize output disruption.

Closed transition is also used in motor starting technology and implies that the change from one coil configuration to another coil configuration occurs without a break in the output. Although there is likely to be an unavoidable step-change in the output level during a transition, it is thought to be less upsetting to the overall system than the open transition. The closed transition uses additional switching elements to allow two successive coil configurations to be briefly interconnected (usually by a load limiting resistor) as the change from one coil configuration to another coil configuration is made.

Regardless of the switching element chosen, it is expected the controller associated with the overall system will be microprocessor based. Large numbers of embedded microcontrollers and/or programmable logic controllers are commercially available each having sufficient inputs/outputs and signal processing power to allow the processors or controller to either directly drive the relay or solid-state devices. As well, the mechanical switch version can be controlled by using a microcontroller to drive a stepper motor or other indexing system to move a mechanical shaft in a drum switch. For the case where solid-state switches or relays are used, several microcontrollers have in-built functions to emulate the physical drum switch described above. One advantage is an elimination of a mechanical drive train and mechanism to provide switching at various positions.

For purposes of illustration, a three phase, 12 lead electric machine is chosen as a model to explain a coil switching arrangement. In developing the coil switching system, such a machine can provide up to 6 different configurations of windings, providing sufficient description of the switching concept. Other configurations of electric machines may be employed.

Several switching technologies can be employed. For example, electromechanical relays may be controlled by a computing device in response to information from one or more sensors, to change an electrical configuration as the operating conditions of the electric machine change. This allows putting the phase coil segments in series or parallel configurations, and allow the overall system to be connected in Wye or Delta configurations. Also for example, solid state switching elements may be controlled by a computing device in response to information from one or more sensors, function in a similar fashion to the electromechanical relay embodiment but without mechanical contacts. As a further example, an integrated, electrically controlled, purpose-built switching assembly may be controlled by a computing device in response to information from one or more sensors. This approach may provide a smaller overall package, and be more easily integrated into the overall electric machine system.

FIG. 1 shows an electric machine system 100 that includes an electric machine 102 and a coil switching system 104, according to at least one illustrated implementation.

The electric machine 102 may include a permanent magnet (PM) rotor 102a, for example, comprised of magnets with one or many pairs of North and South magnet poles, which rotates around a stator 102b of magnetic material. When operated as a generator, the rotor 102a is mechanically driven by a prime mover with constant or variable speed characteristics.

The stator 102b is equipped with multiple sets of electrical coils 102c, 102d (only two called out in FIG. 1) generally arranged equidistant from each other to be distributed at equal angular distances around a periphery of the stator 102b. A given coil set is made up of two or more sections 102c, 102d. The electrical connections 106 (only two called out in FIG. 1) from each section of each coil are presented outside the stator 102b for electrical connection to a coil switching assembly 108, which is part of the coil switching system 104.

For purposes of describing the coil switching system 104, the stator 102b is illustrated and described as having a total of six coils, in a typical 3-phase arrangement, although other implementation are possible. The illustrated implementation allows for 6 switched arrangements as follows:

a. Single Wye configuration, in which one set of three coils are coupled in a single Wye configuration;
b. Parallel of two Wye configurations, in which two sets of three coils are each coupled in a respective Wye configuration, and the two sets Wye coupled coils are coupled in parallel to one another;
c. Single Delta configuration, in which one set of three coils are coupled in a single Delta configuration;
d. Parallel of two Delta configurations, in which two sets of three coils are each coupled in a respective Delta configuration, and the two sets Delta coupled coils are coupled in parallel to one another;
e. Full Wye configuration, in which one set of three pairs of coils are coupled in a single Wye configuration, the coils of each respective pair of coils being coupled in series with the other coil of the respective pair;
f. Full Delta configuration, in which one set of three pairs of coils are coupled in a single Delta configuration, the coils of each respective pair of coils being coupled in series with the other coil of the respective pair.

Where the electric machine has more coils, additional switched arrangements are possible. For example, the coil switching system 104 may realize an arrangement of a parallel of three or more Wye or Delta configurations, or a full Wye configuration or full Delta configuration with each leg comprised of sets of three or more coils coupled in series, rather than pairs of coils.

The switching assembly 108 is electrically coupled to all coil connections. The coil switching system 104 also includes a control system 110 which may include one or more processors or microcontrollers or other circuitry, operation of which can make any desired coil connection to any other single or multiple coil connection. For any coil arrangement made, 3 connections are made available as outputs to an external load 112.

To facilitate the selection of a given coil switching arrangement, one or more sensors 114a, 114b, 114c (seven total sensors of three different types illustrated in FIG. 1) provide signals to the control system 110, for example, as follows:

a. Output voltage
b. Output current
c. Rotor RPM
d. Rotor relative angle

Figure 2:
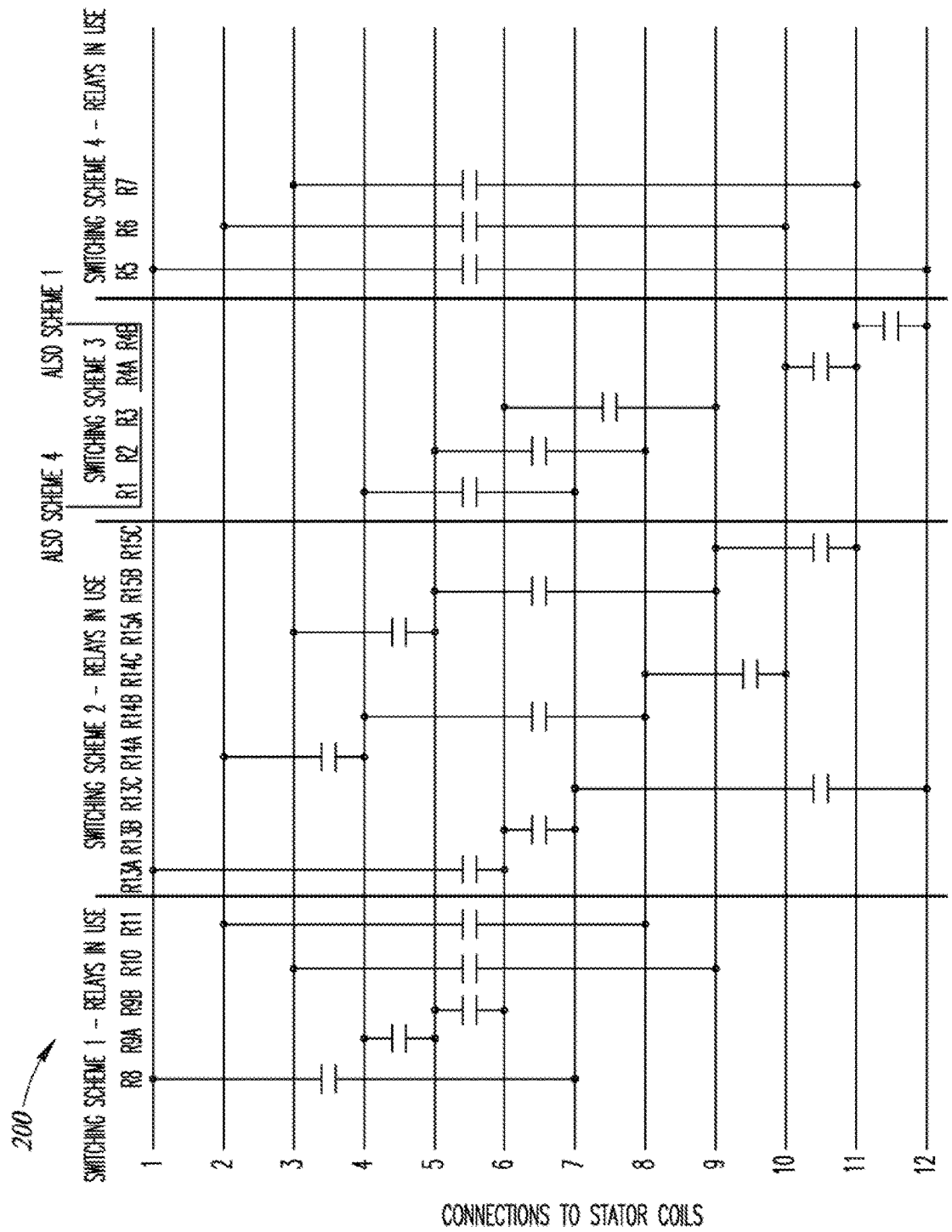
FIG. 2 is a schematic diagram of a number of electrical switching schemes that can be realized or implemented via the electric machine system of FIG. 1, employing a number of switches, according to at least one illustrated implementation.

For each switching arrangement computed, the controller of the control system 110 may drive one or more relays, turn ON one or more solid-state switches, or direct a motorized positioner to make one or more connections between a group of the coil connections, as illustrated in FIGS. 2 and 3).

In particular, FIG. 2 shows a schematic diagram of a number of electrical switching schemes 200 that can be realized or implemented via the electric machine system of FIG. 1, employing a number of switches, according to at least one illustrated implementation. The respective states (i.e., ON, OFF) of the switches are controlled by the controller of the control system 110, based on information representative of the operating conditions of the electric machine 102. The switches can be mechanical switches (e.g., electro-mechanical relays) or solid state switches (e.g., MOS-FETs, IGBTs, solid state relays), or a combination of mechanical switches and solid-state switches.

Figure 3B:
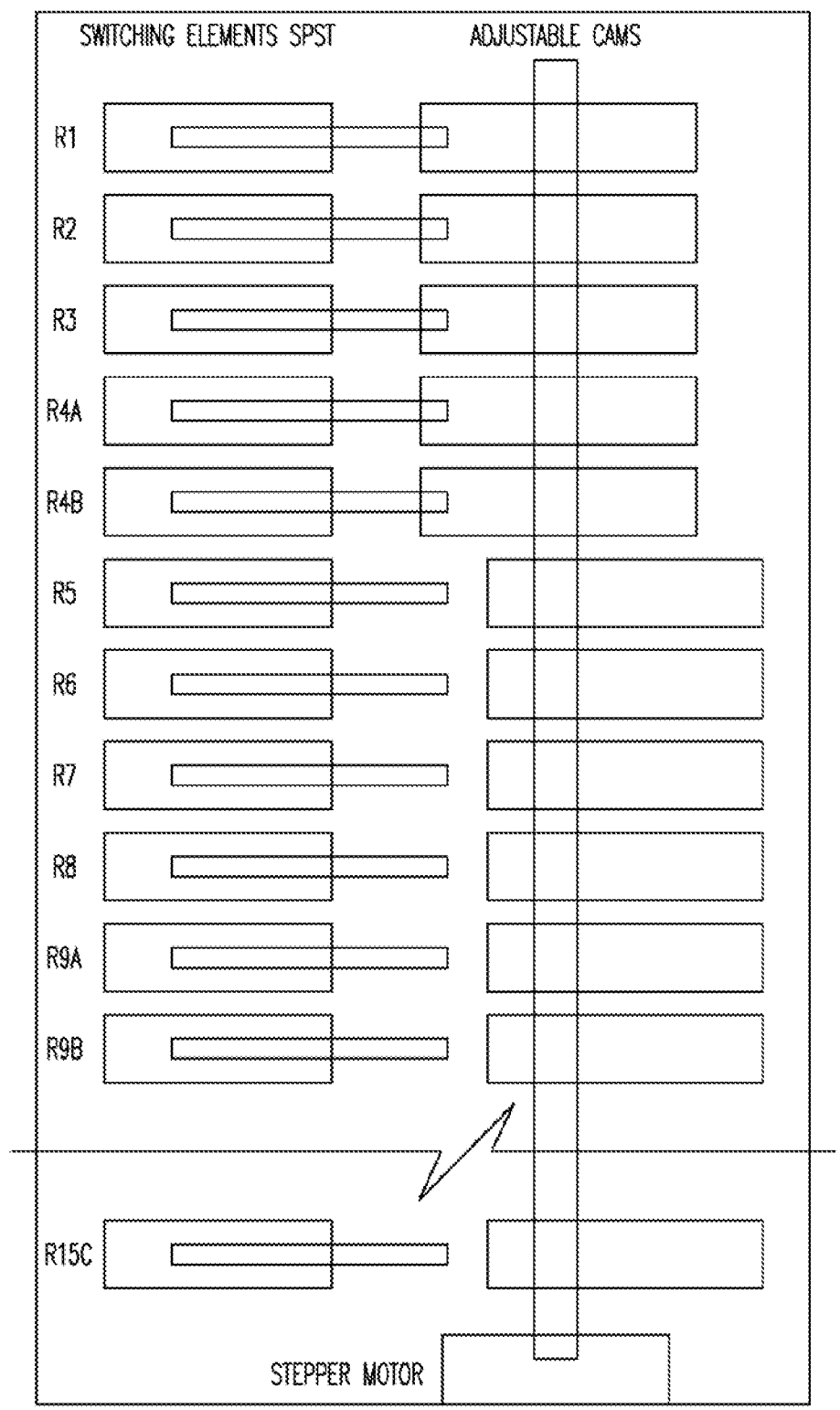
FIG. 3B is a schematic diagram of a motorized positioner that can realize or implement a number of electrical switching schemes via the electric machine system of FIG. 1, for example in accordance with the table of FIG. 3A, according to at least one illustrated implementation.

In particular, FIG. 3A is a table of a number of electrical switching schemes 300a that can be realized or implemented via the electric machine system of FIG. 1, via a motorized positioner 300b (FIG. 3B), according to at least one illustrated implementation. FIG. 3B shows a motorized positioner 300b, according to at least one illustrated implementation. The motorized positioner 300b can realize or implement the number of electrical switching schemes via the electric machine system of FIG. 1, for example in accordance with the table of a number of electrical switching schemes 300a (FIG. 3A). The position (e.g., angular orientation) of the motorized positioner 300b is controlled by the controller of the control system 110, based on information representative of the operating conditions of the electric machine 102.

Figure 4:
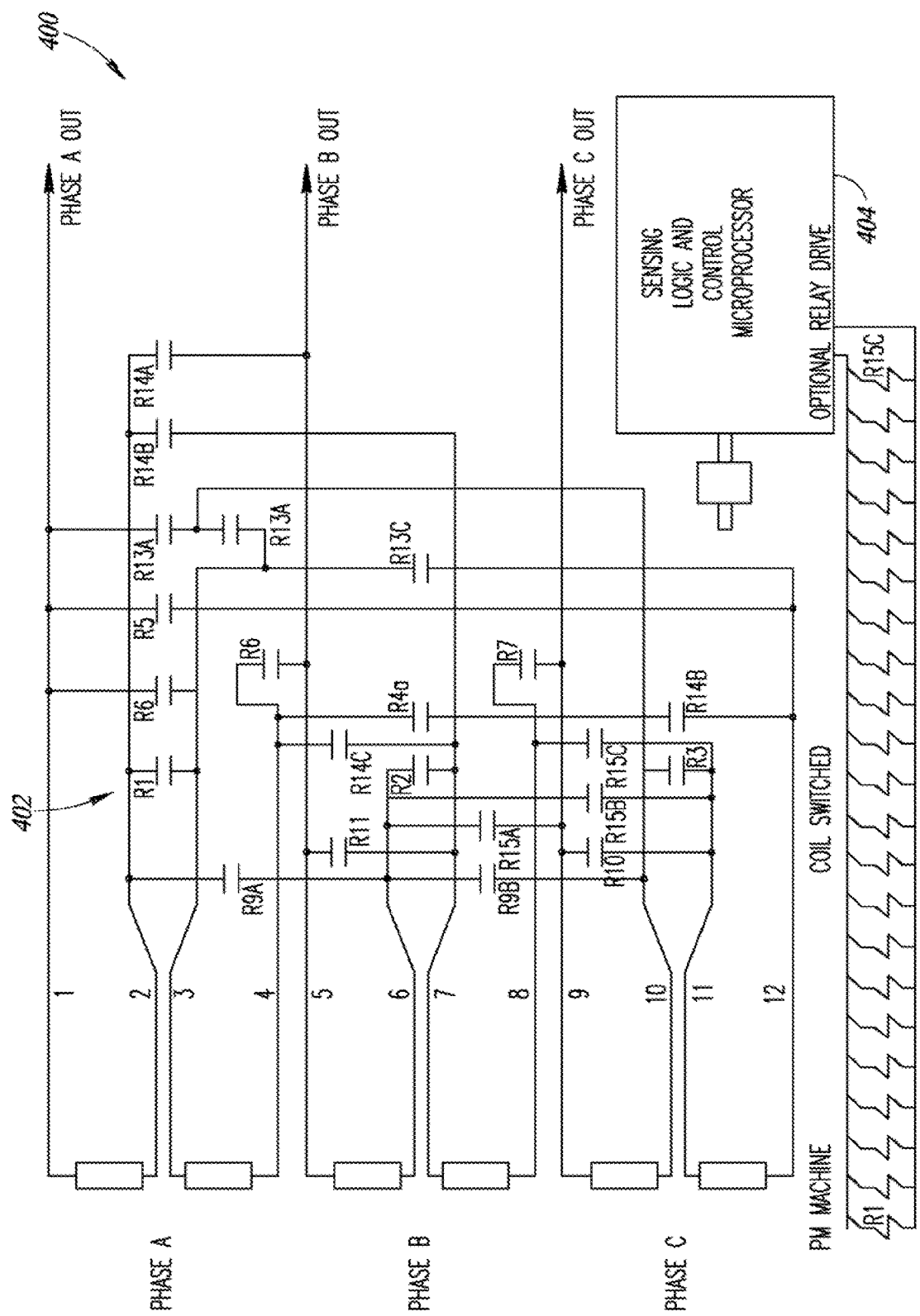
FIG. 4 is a schematic diagram of coil switching system that includes a switching assembly and a control system communicatively coupled to control the switching assembly, according to at least one illustrated implementation.

FIG. 4 illustrates a coil switching system 400, according to at least one illustrated implementation.

The coil switching system 400 includes a switching assembly 402 and a control system 404 which may include one or more processors or microcontrollers or other circuitry (individually or collectively denominated as controller), operation of which controls the switching assembly 402 to make any desired coil connection to any other single or multiple coil connection.

Figure 5:
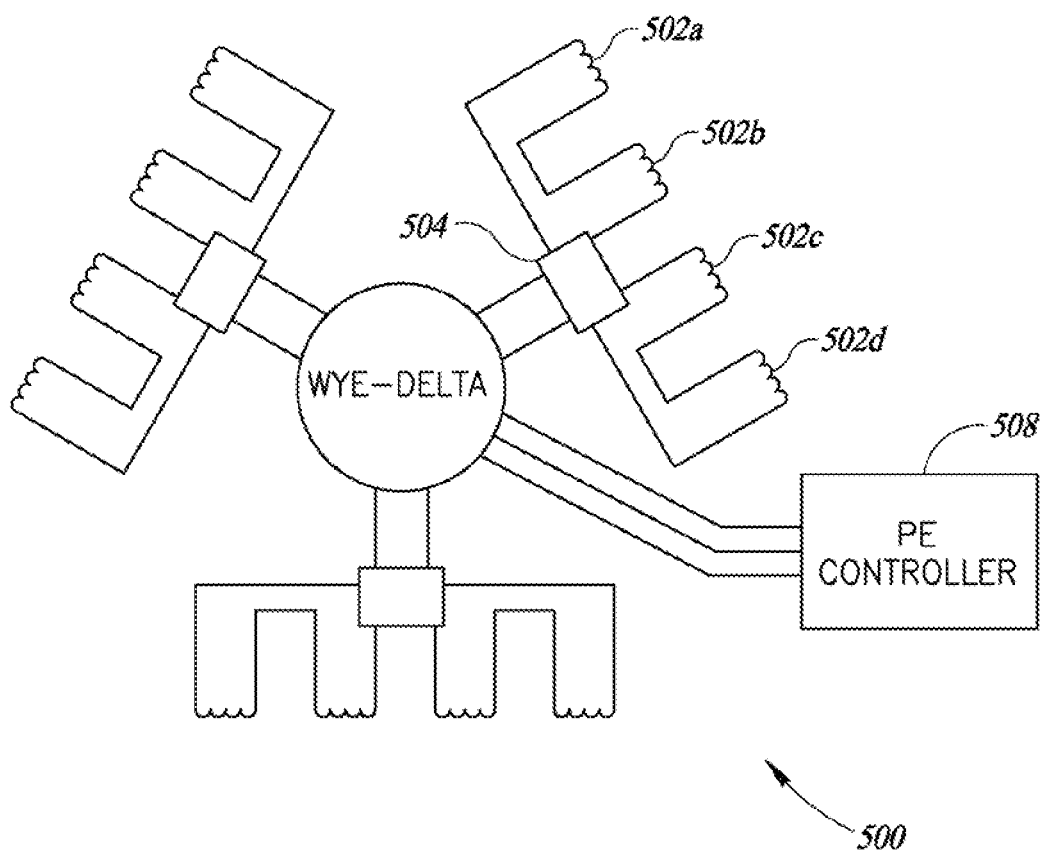
FIG. 5 is a schematic diagram of illustrates a simplified coil switching configuration architecture that advantageously employs a few components while providing for multiple coil configurations, according to at least one illustrated implementation.

FIG. 5 illustrates a diagram of a simplified coil switching configuration architecture 500 that advantageously employs a few components while providing for multiple coil configurations, according to at least one illustrated implementation. The coil switching configuration architecture 500 may employ either semiconductor switches, or mechanical switches, or both semiconductor switches and mechanical switches. The illustrated implementation has one switch for each of the three phases of the electric machine. For example, each phase has 4 coils 502a, 502b, 502c, 502d (called out for only one phase in FIG. 5, collectively 502) in the exemplary 12 coil electric machine example.

In this illustrated implementation of FIG. 5, each set of four coils 502 are wound in series, but have a switch 504 (called out for only one phase in FIG. 5) between the second coil 502b and the third coil 502c, which allows the series coils to be divided into two sets of series coils 502a, 502b; 502c, 502d combined in parallel. The switching of the leads from the coils may be accomplished with a 4 pole double throw relay or comparable other mechanical switch, or alternatively semiconductor switches.

Each of the three phases can then be combined with a second switch 506 that combines the three phases into either a Wye configuration or Delta configuration. The switches 504, 506 are responsive to control signals provided via a control system 508. Effectively the illustrated implementation of FIG. 5 offers 4 coil configurations with a simple inexpensive switch design that requires only one multiple pole relay 504 per phase (4P2T) and another switch 506 to connect all the phases into either a Wye configuration or Delta configuration.

Rather than a drum type switch as described above, another implementation advantageously provides a switching assembly that can switch many contacts at once, without relays that may require ongoing excitation to maintain the switching state.

Figure 6A:
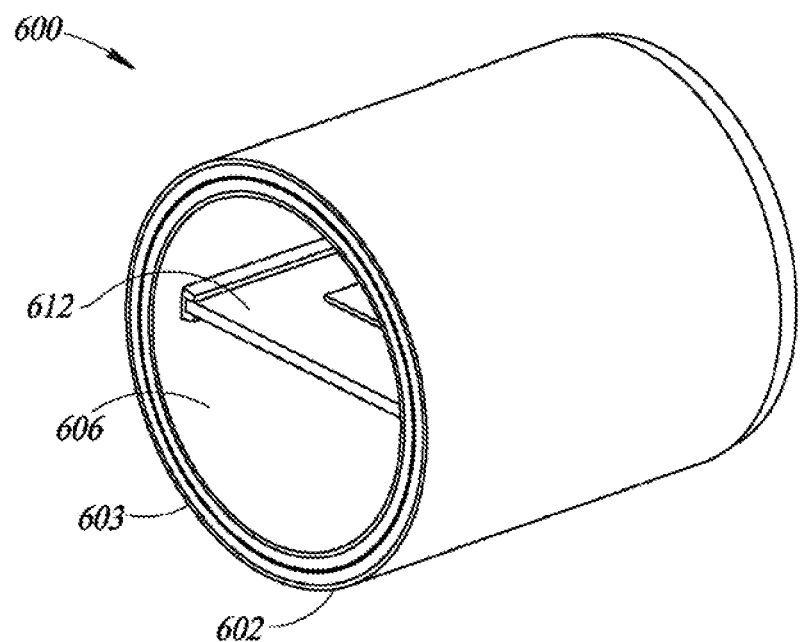
FIG. 6A is a side, front, isometric view of a rotary switching control assembly, operable to modify electric machine winding coil configurations for both electric motor and electric generator operations, according to at least one illustrated implementation, the rotary switching control assembly including an outer tube, an inner tube rotatably received by the outer tube with electrical contacts or electrodes between the inner and the outer tubes, and circuitry communicatively coupled to the electrodes.
Figure 6B:
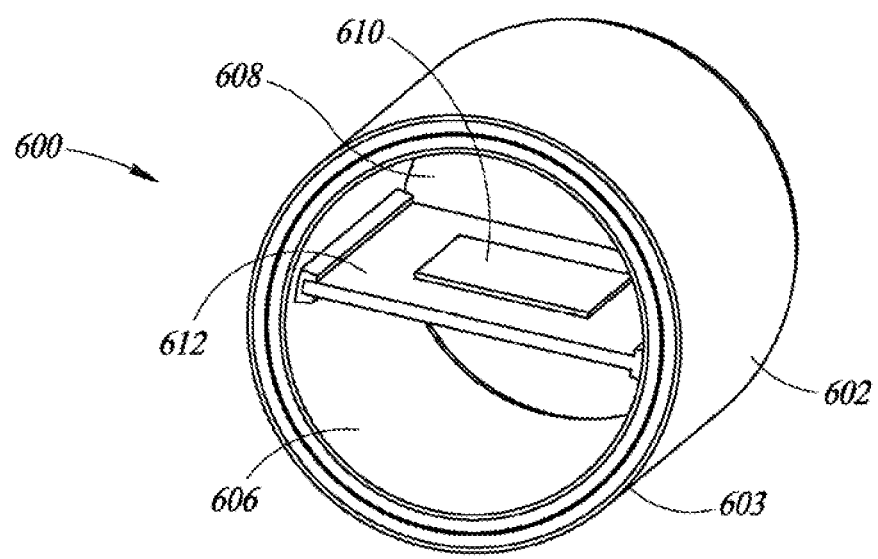
FIG. 6B is a front, side, isometric view of the rotary switching control assembly of FIG. 6A.
Figure 6C:
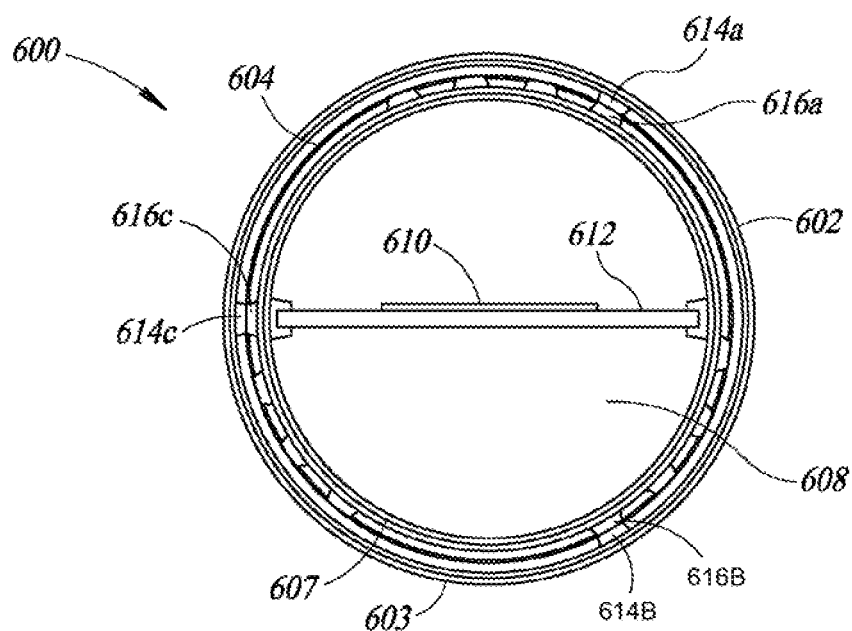
FIG. 6C is a front view of the rotary switching control assembly of FIG. 6A.

FIGS. 6A-6C show a rotary switching control assembly 600, operable to modify electric machine winding coil configurations for both electric motor and electric generator operations, according to at least one illustrated implementation.

The rotary switching control assembly 600 includes an outer tube 602 (e.g., cylinder) having a side wall 603 that delimits an interior 604 of the outer tube 602 from an exterior thereof. The outer tube 602 may be fixed or stationary, for example, mounted to a support structure such as a frame.

The rotary switching control assembly 600 also includes an inner tube 606 (e.g., cylinder) having a side wall 607 that delimits an interior 608 of the inner tube 606 from an exterior thereof. The inner tube 606 rotatably mounted in the interior 604 of the outer tube 602, for example, for rotation about a longitudinal axis of the outer tube 602 and, or the inner tube 606.

The rotary switching control assembly 600 also includes a set of circuitry 610, for example, mounted on one or more printed circuit boards (PCBs) 612. The PCB 612 may be mounted in the interior 608 of the inner tube 606, to a portion of the side wall 607 of the inner tube 606 where contact leads enter into the interior 608 of the inner tube 606. A wiring harness (not shown) bring all the wire leads from the contacts to the PCB 612 that accomplishes the coil reconfiguration. In addition, the circuitry 610 on the PCB 612 may perform a variety of additional functions or operations. For example, the circuitry 610 may provide additional capacitance where needed for each of the coil configurations, allowing optimization for the differing coil configurations and inductances. The circuitry 610 may include additional electronics can assist in operations, including, for example, snubber circuitry or other suppression or signal conditioning circuit components.

The inside surface of the outer tube 602 has one or more rows of electrical contacts or electrodes 614a, 614b, 614c (three rows called out in FIG. 6C and two rows in FIG. 8, collectively 614), and those electrical contacts or electrodes 614 are wired to a specific configuration for the coils of the rotating electric machine. The inner tube 606 is fitted with one or more rows of electrical contacts or electrodes 616a, 616b, 616c (only three rows called out in FIG. 6C and two rows called out in FIG. 7, collectively 616) as well, but these are the electrical contacts or electrodes 616a, 616b, 616c that go directly to the coils of the electric machine. FIG. 6C shows electrical contacts or electrodes of each of three rows of electrical contact or electrodes 616 of the inner tube 606 lined up with, engaged with, and in electrical communications respective electrical contacts or electrodes of three rows of electrical contact or electrodes 614 of the outer tube 602. There may be one row for the entire electric machine, or multiple rows given multiple phases of the electric machine. A single row of electrical contacts or electrodes may be used for a single phase electric machine or three sets of contacts for a three phase electric machine. Alternatively, all three phases may be incorporated on a single row of electrical contacts or electrodes.

The inner tube 606 may have any number of electrical contacts or electrodes arranged in rows or arrays that correspond to the alignment of the electrical contacts or electrodes on the inside surface of the side wall 603 of the outer tube 602. As the inner tube 606 rotates in a controlled fashion, the rotation will change the electrical contacts or electrodes that are coming from the leads of the electric machine which are hard wired to the outer tube 602.

Switching can be controlled via a small motor (not shown in FIGS. 6A-6C) and an encoder or other appropriate sensor(s) or other structures (not shown in FIGS. 6A-6C) that provide feedback signals to the control system. The motor is drivingly coupled to rotate the inner tube 606 relative to the outer tube 602, with contact surfaces oriented to selectively engage and disengage various switching configurations. An alternate implementation rotates the inner tube 606 relative to the outer tube 602 using electromagnets, to pull the inner tube 606 or portions thereof into a desired one of a number of possible positions via magnetic attraction.

The timing for rotation is accurately controlled and used to ensure the mechanical event corresponds with the electrical so that the switching is accomplished at the zero crossing. In the prior art there are systems that can accurately time high speed mechanical events, such as firing a spark plug in a combustion engine. The time of a switching event can be highly accurate to ensure switching happens as close to the zero crossing of the current waveform as possible. A controller, e.g., microprocessor, can accomplish accurate timing.

Figure 7:
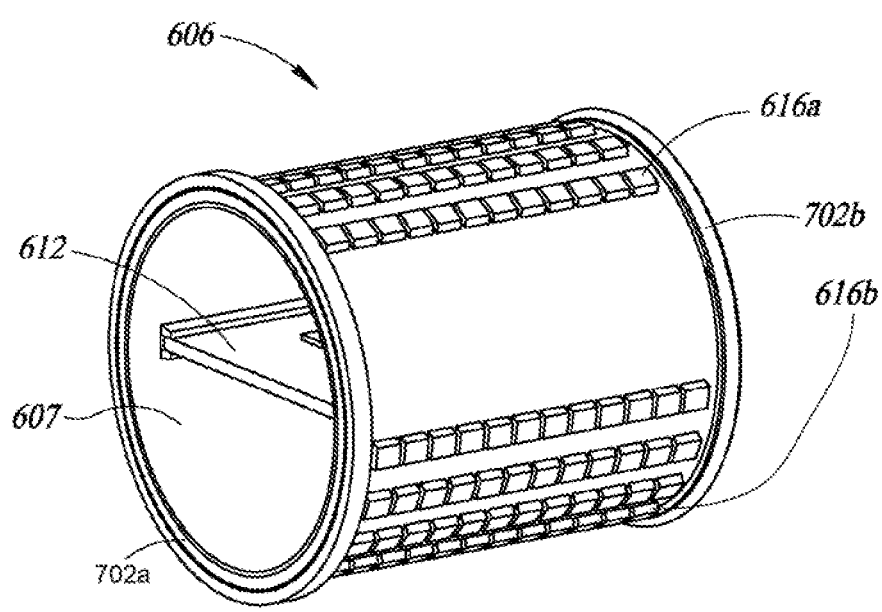
FIG. 7 is a side, front, isometric view of the inner tube of the rotary switching control assembly of FIGS. 6A-6C, better illustrating the electrical contacts or electrodes and a set of bearings that rotatable mount the inner tube to the outer tube.

FIG. 7 shows the inner tube 606 of the rotary switching control assembly 600 of FIGS. 6A-6C, better illustrating certain aspects thereof.

As best seen in FIG. 7, the inner tube 606 carries several sets or arrays of electrical contacts or electrodes 616. The electrical contacts or electrodes 616 can be carried on an outer surface of the sidewall 607 of the inner tube 606, so as to be physically engageable by complementary electrical contacts or electrodes 614 carried on an inner surface of the sidewall 604 of the outer tube 602. The electrical contacts or electrodes 616 are arranged in patterns based on the type of electrical machine to be configured.

For example, for a three phase machine each of the three phases may have all the appropriate coil configurations aligned with 120 degree offsets from each other such that the first row of electrical contacts or electrodes for each phase is aligned with the other two. As the inner tube 606 rotates into alignment all three phases will be connected with the appropriate configuration for all coils of the electric machine. In order to time the zero-crossing of all three phases, there may be an alignment offset of the three switched phase contacts such that the 120 degree electrical offset of phases in accounted for and all switching is accomplished at the zero-crossing.

The inner tube 606 may also have one or more bearings or sets of bearings 702a, 702b (collectively 702), for example, bearing rings positioned on either end (e.g., front, back) of the inner tube 606. The bearings 702 mount the inner tube 606 to freely rotate in the interior 604 of the outer tube 602, while maintaining alignment of the electrical contacts or electrodes 614, 616 such that the rotational movement of the inner tube 606 will connect alternate sets of electrical contacts or electrodes with complementary electrical contacts or electrodes 614 of the inside surface of the outer tube 602. The bearings 702 can take any variety of forms, including bearing with one or more races, ball bearings, conical bearings, etc.

Figure 8:
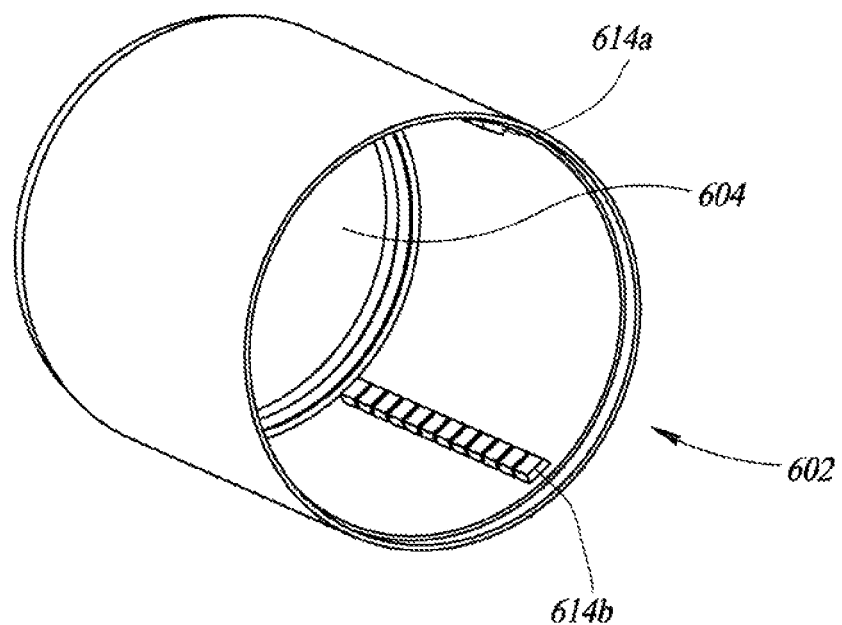
FIG. 8 is a side, front, isometric view of the outer tube of the rotary switching control assembly of FIGS. 6A-6C, better illustrating the outer tube.

FIG. 8 shows the outer tube 602 of the rotary switching control assembly 600 of FIGS. 6A-6C, better illustrating certain aspects thereof.

The outer tube 602 is preferably stationary and supports the inner tube 606, for example, via a bearing 702a, 702b on either end of the outer tube 602.

As best seen in FIG. 8, the outer tube 602 carries several sets or arrays of electrical contacts or electrodes 614. The electrical contacts or electrodes 614 can be carried on an inner surface of the sidewall 603 of the outer tube 602, so as to be physically engageable by complementary electrical contacts or electrodes 616 carried on an outer surface of the sidewall 607 of the inner tube 606. The electrical contacts or electrodes 614 are arranged in patterns based on the type of electrical machine to be configured.

Figure 9A:
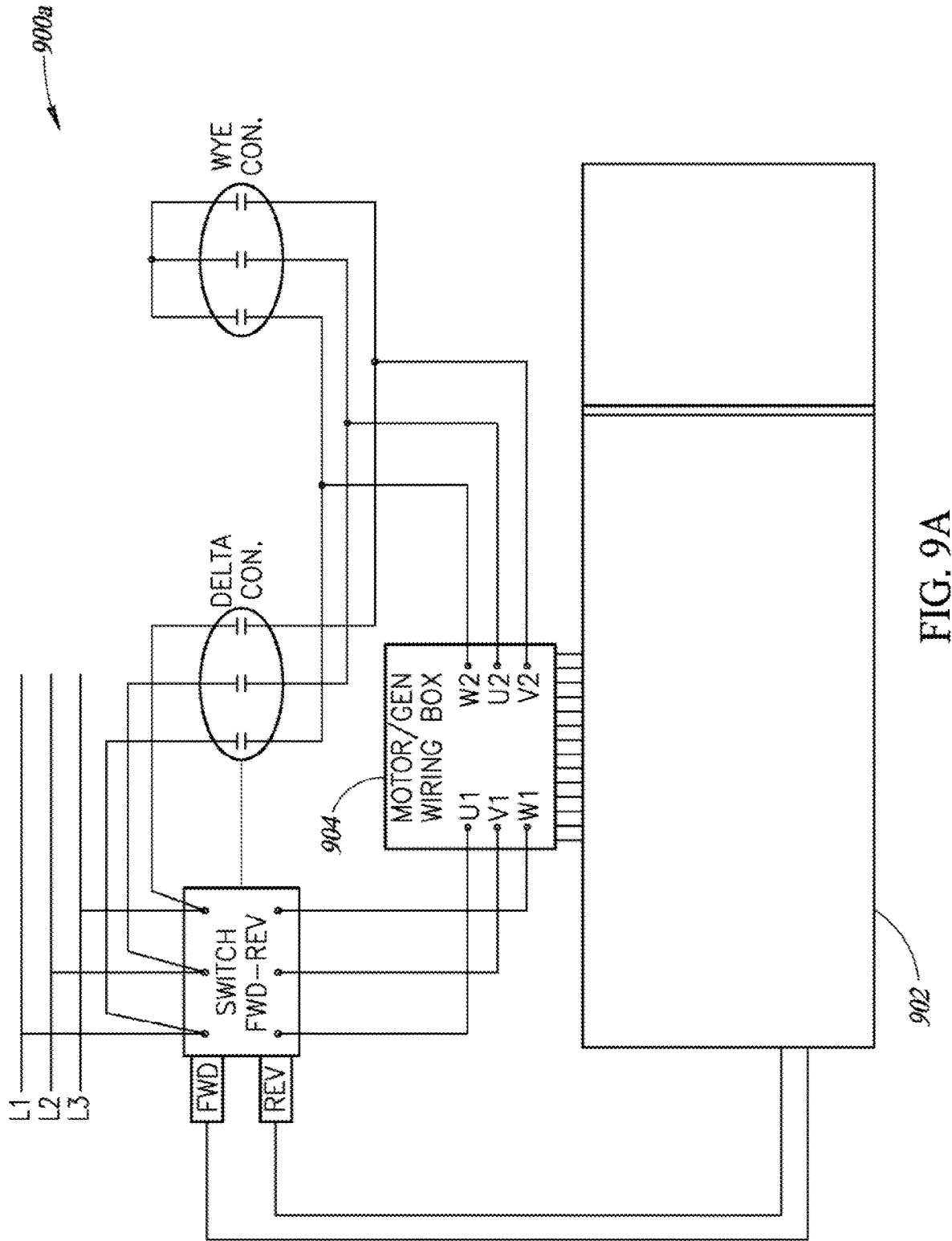
FIG. 9A is a schematic diagram of a system to affect phase coil switching, according to at least one other illustrated implementation.

FIG. 9A shows a system 900a to affect phase coil switching, according to another implementation. The switching may be accomplished as already described, or for certain electric machines (e.g., an induction electric machine), the switching may be performed in concert with other systems that modify electrical machine configuration, such as a typical induction machine capable of reconfiguring from Wye to Delta with reverse capabilities. In this approach, the coils are switched at the control system 902 below a wiring box 904. The system 900a can use existing switching for Wye and Delta in concert with other system components to enable the electric machine.

Figure 9B:
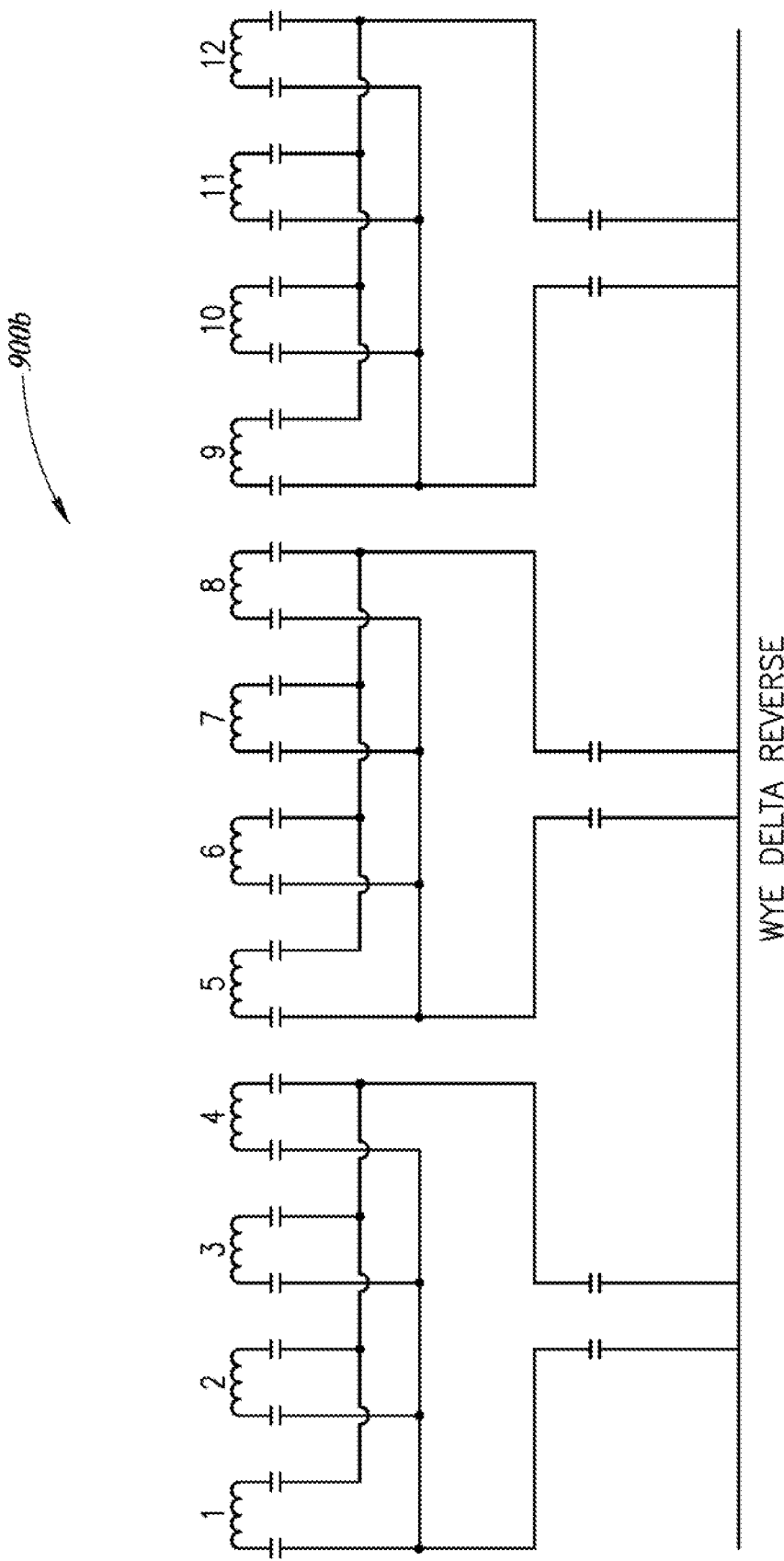
FIG. 9B is a schematic diagram of a set of connections in a switch drum used for a 12 coil three phase machine with all coils from each phase connected in parallel, according to at least one other illustrated implementation.

FIG. 9B shows a set of connections 900b in the inside of the switch drum (e.g., on printed circuit board), for the 12 coil three phase electric machine with all coils from each phase connected in parallel. The parallel lines near the coil represent the mechanical contacts that move to select each of the wiring configurations, and notably are not capacitors. Beneath the switching schematic is the Wye to Delta winding reconfiguration from the existing system. The switching described, allows for a reconfiguration of those coils without combining the capabilities of the coil switching and the Wye and Delta options. This makes the illustration of the connections more apparent as can be seen in the illustration.

As with the more complicated reconfiguration above, each configuration may have its own capacitance and or resistive elements specific to that winding configuration. For example, the various implementations described herein can employ one or more snubber circuits electrically coupled to control transients (e.g., transient voltage spikes).

Figure 9C:
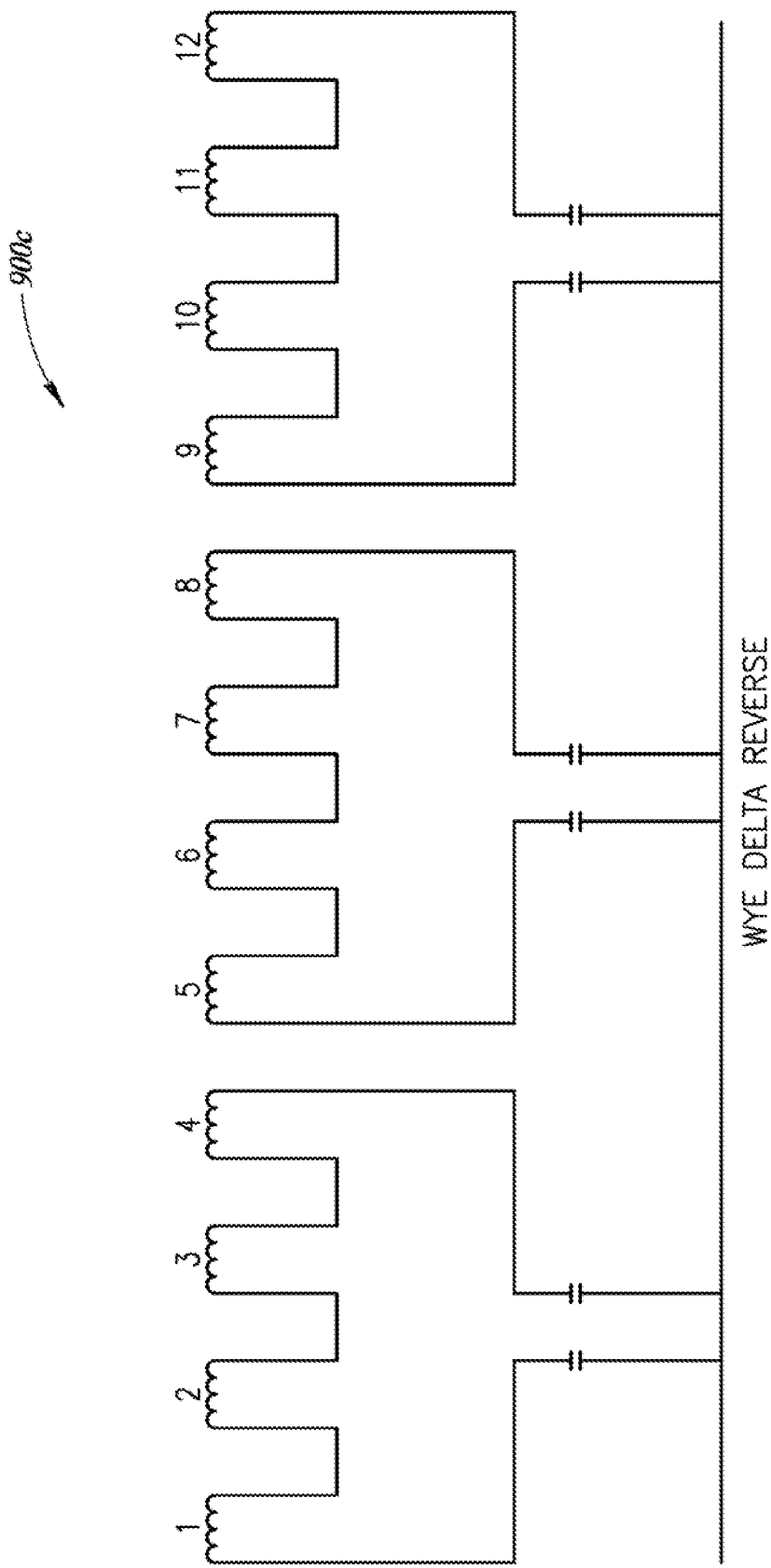
FIG. 9C is a schematic diagram of a set of connections in a switch drum used for a 12 coil three phase machine with all coils from each phase connected in series, according to at least one other illustrated implementation.

FIG. 9C shows a set of connections 900c in the inside of the switch drum (e.g., on printed circuit board), for the 12 coil three phase electric machine with all coils from each phase connected in series. The parallel lines near the coil represent the mechanical contacts that move to select each of the wiring configurations, and notably are not capacitors.

Figure 9D:
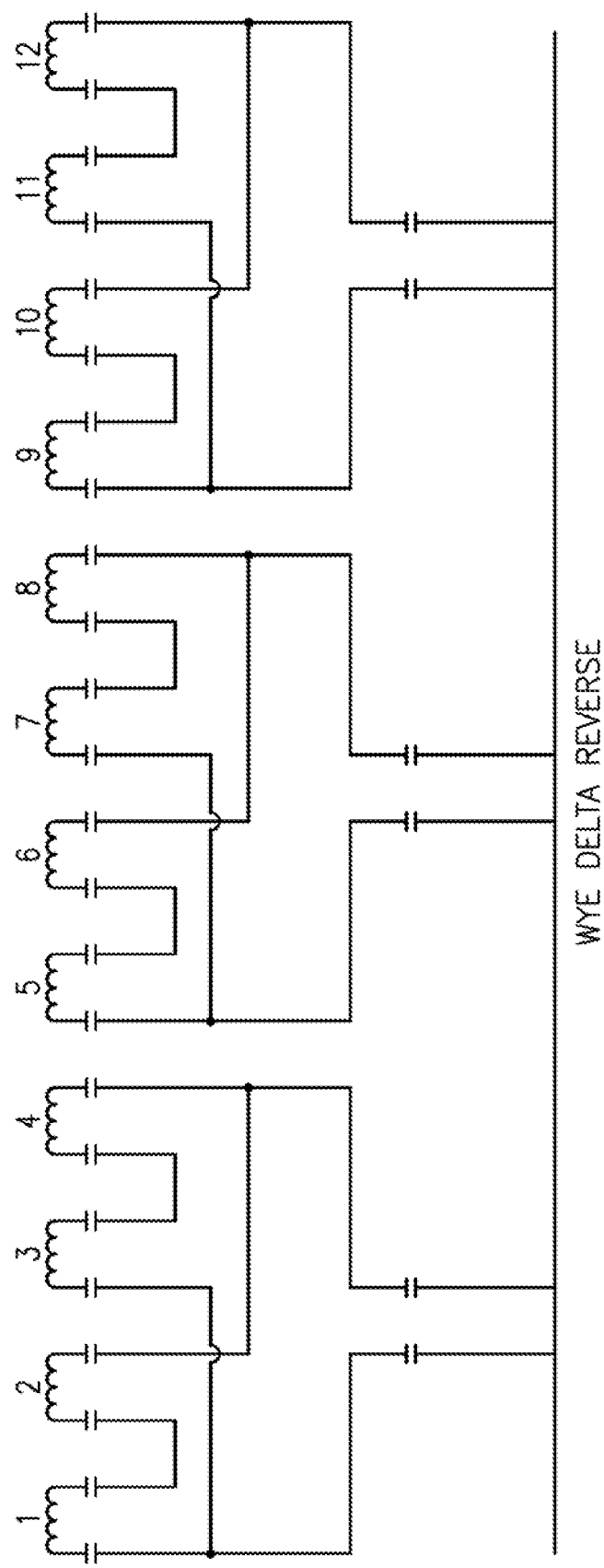
FIG. 9D is a schematic diagram of a set of connections in a switch drum used for a 12 coil three phase machine with the coils divided into two coils in series paralleled together (series and parallel), according to at least one other illustrated implementation.

FIG. 9D shows a set of connections 900d the connections for the 12 coil three phase electric machine with coils divided into two coils in series paralleled together (series and parallel). The parallel lines near the coil represent the mechanical contacts that move to select each of the wiring configurations, and notably are not capacitors.

Figure 9E:
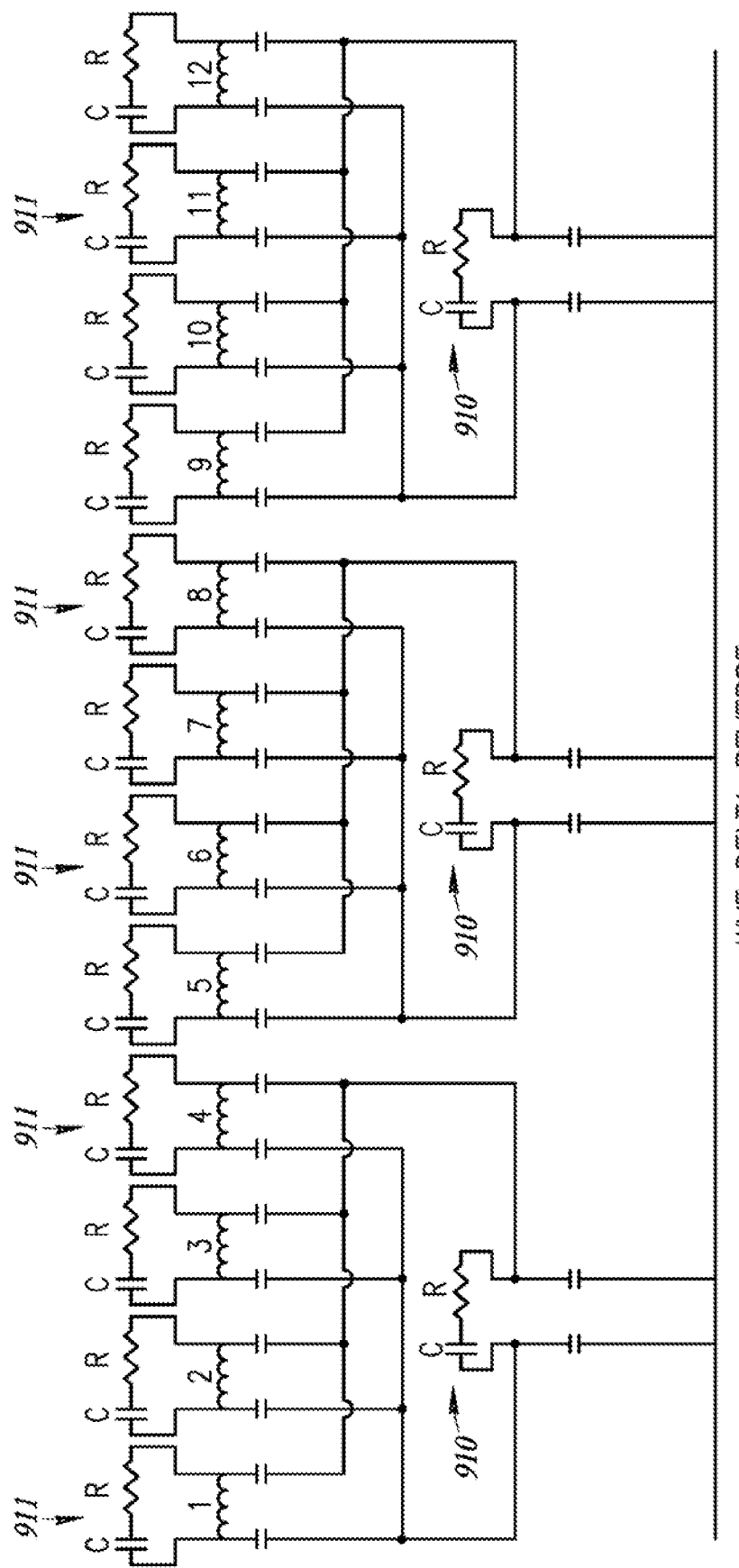
FIG. 9E is a schematic diagram of a set of connections in a switch drum used for a 12 coil three phase machine with the coils divided into two coils in series paralleled together (series and parallel) and including a plurality of snubbers, according to at least one other illustrated implementation.

FIG. 9E shows the set of connections of FIG. 9D, and further includes a plurality of snubbers, according to at least one other illustrated implementation. Advantageously, a respective snubber 910 (only five called out) can be coupled across each group or set of coils or windings, for example each group or set of coils on a respective stator tooth.

Additionally or alternatively, a respective snubber 912 (three called out) can be coupled across each coil or winding.

The snubbers 910, 912 can, for example, each be implemented via a respective capacitor C and resistor R electrically coupled in series. The capacitor C and resistor R have specifications which are suitable to handle any transients or overshoots that are likely to be encountered during operation of a circuit.

Inclusion of a respective snubber per group or set of coils or windings may be particularly advantageous, for example requiring less individual components to effectively handle transients or overshoots than a configuration that includes a respective snubber for each coil or winding.

Figure 9F:
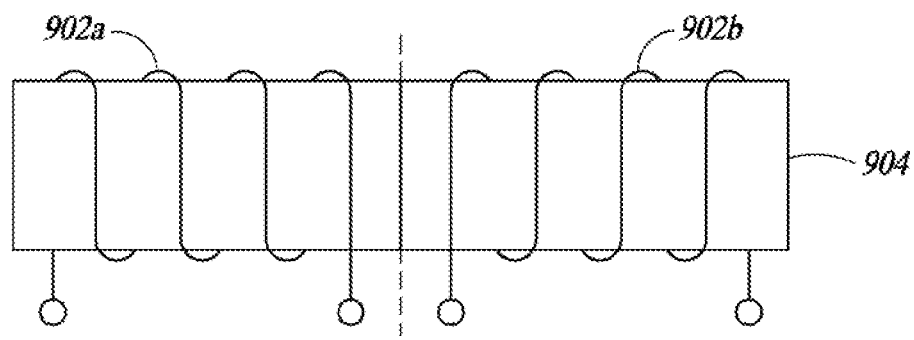
FIG. 9F is a plan view of a stator tooth with two coils wrapped there around, according to at least one other illustrated implementation.
Figure 9G:
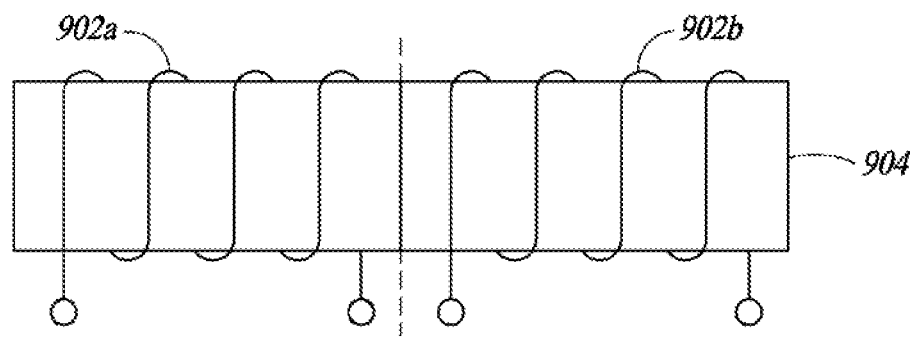
FIG. 9G is a plan view of a stator tooth with two coils wrapped there around, according to at least one other illustrated implementation.
Figure 9H:
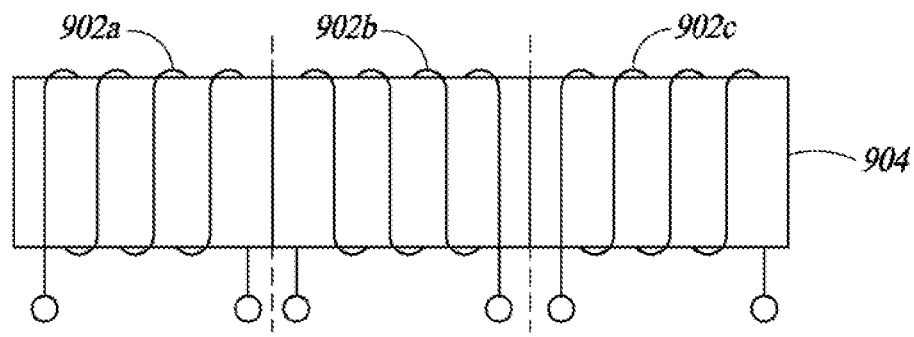
FIG. 9H is a plan view of a stator tooth with three coils wrapped there around, according to at least one other illustrated implementation.
Figure 9I:
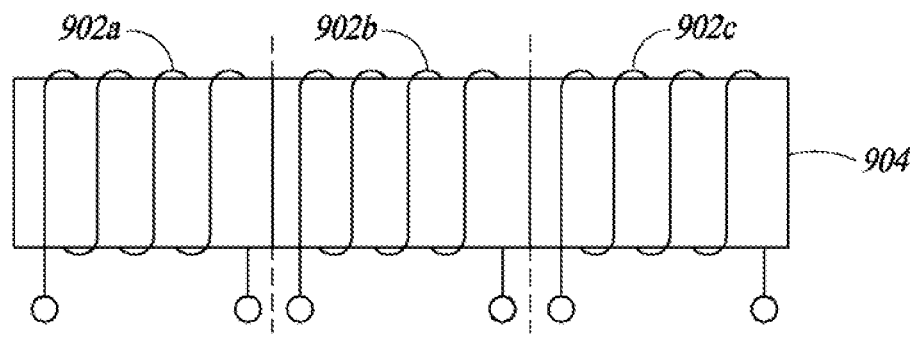
FIG. 9I is a plan view of a stator tooth with three coils wrapped there around, according to at least one other illustrated implementation.

As illustrated in FIGS. 9F-9G, a coil may, for example, be divided into two or more coils 902a, 902b, 902c on a given stator tooth 904. Under this approach, rectification of the output (e.g., fora generator) will advantageously require only two diodes rather than four to accomplish full wave rectification. This provides a structure that effective replicates multiple coils on electric machines that might otherwise not have enough coils to utilize the coils switching technology taught herein, and thus may be particularly suited for retrofits, for example after-market retrofits, and can be packaged as a retrofit kit.

Various implementations described herein may allow for fully operational three phase rectification, and corresponding benefits, where the previous approaches could not. In addition, various implementations described herein allow for active rectification capabilities where the previous approaches could not. Various implementations described herein allow reconfiguration between Wye and Delta configurations, where the previous approaches were restricted to one configuration, e.g., Delta only. Various implementations described herein are able to integrate into existing control systems along with attendant advantages, which is a significant improvement where the previous approaches could not.

Figure 10:
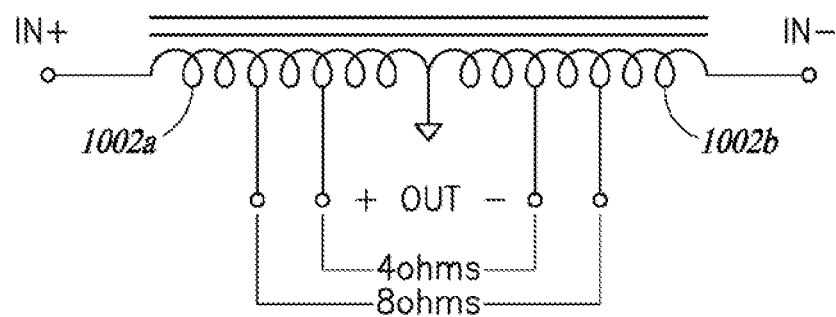
FIG. 10 is a schematic diagram that shows an exemplary set of multi-tapped coils, according to at least one other illustrated implementation.

FIG. 10 shows an exemplary set of multi-tapped coils 1002a, 1002b, according to at least one other illustrated implementation.

The multi-tapped coils 1002a, 1002b provide the ability to implement various different configurations from the coils directly due to their being separated windings (two or more windings) on each stator tooth.

Figure 11:
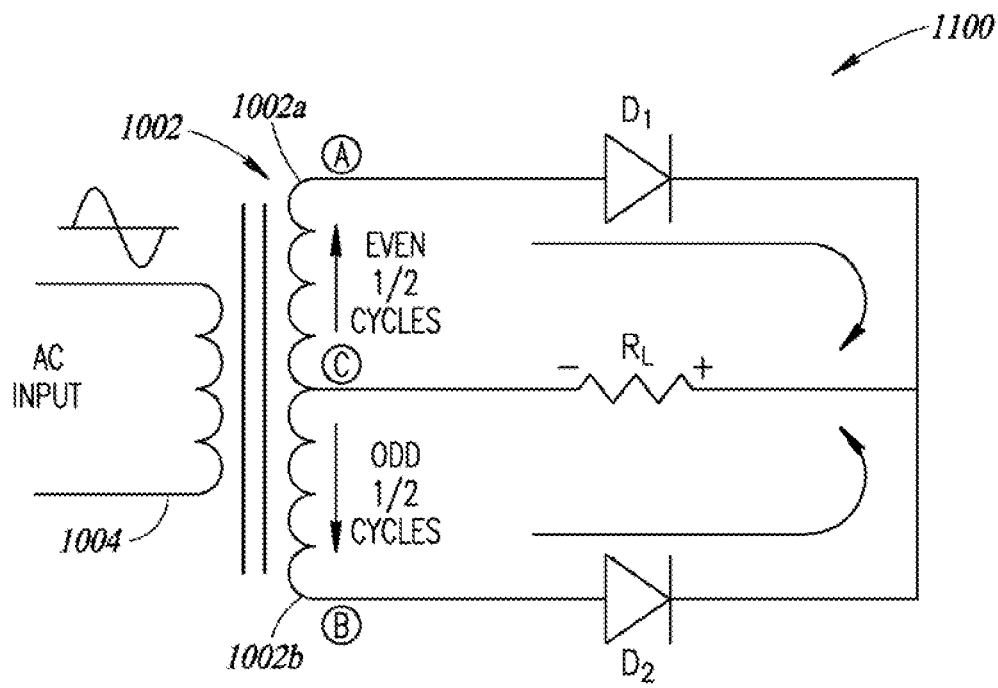
FIG. 11 is a schematic diagram shows a circuit that implements a center tapped rectification, according to at least one other illustrated implementation.

FIG. 11 shows a circuit 1100 that implements a center tapped rectification, according to at least one other illustrated implementation. The circuit 1100 includes an inductor or coil 1002 that is split into sections 1002a, 1002b, via a center tap 1004, with a respective diode $D_1$, $D_2$ electrically coupled to each of the sections 1002a, 1002b and a resistor $R_L$ electrically coupled to the center tap 1004 to create respective paths where a current flow goes from one section 1002a, 1002b, through its respective diode $D_1$, $D_2$, and then through the resistor $R_L$ to the other section 1002 during each half cycle of an AC input provided via a primary inductor 1004. The circuit 1100 demonstrates the ability to rectify using just two passive devices, e.g., diodes.

In this specification, the term "processor" is used. Generally, "processor" refers to hardware circuitry, in particular any of microprocessors, microcontrollers, application specific integrated circuits (ASICs), digital signal processors (DSPs), programmable gate arrays (PGAs), and/or programmable logic controllers (PLCs), or any other integrated or non-integrated circuit that perform logic operations.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Exro Technologies, Inc., including but not limited to: U.S. patent publication Nos. 2012-0229060; 2011-0241630; U.S. Pat. No. 8,106,563; and U.S. patent publication Nos. 2010-0090553; and U2014-0252922, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a switching assembly including:
    a first substrate;
    a first set of electrical contacts carried by the first substrate;
    a first set of conductors to electrically coupleable the first set of electrical contacts with coils of an electric machine;
    a second substrate; and
    a second set of electrical contacts carried by the second substrate,
    wherein at least one of the first substrate and the second substrate is movable relative to the other of the first substrate and the second substrate such that a plurality of subsets of the first set of electrical contacts are selectively, electrically coupleable to at least a portion of the second set of electrical contacts to change an effective winding configuration of the electric machine,
    wherein the switching assembly is operable to selectively electrically couple the coils of the electric machine in at least a series combination of coils and a parallel combination of coils; and
    wherein the switching assembly is operable to selectively electrically couple the coils of the electric machine in a first Wye configuration and a first Delta configuration, the first Wye configuration in which one set of three coils are coupled in a single Wye configuration and the first Delta configuration in which one set of three coils are coupled in a single Delta configuration.

2. The system of claim 1 wherein the switching assembly is operable to selectively electrically couple the coils of the electric machine in a second Wye configuration and a second Delta configuration, the second Wye configuration in which one set of three pairs of coils are coupled in a single Wye configuration, the coils of each respective pair of coils being coupled in series with the other coil of the respective pair and the second Delta configuration in which one set of three pairs of coils are coupled in a single Delta configuration, the coils of each respective pair of coils being coupled in series with the other coil of the respective pair.

3. The system of claim 1 wherein the switching assembly is operable to selectively electrically couple the coils of the electric machine in a second Wye configuration and a second Delta configuration, the second Wye configuration in which one set of three subsets of coils are coupled in a single Wye configuration, the coils of each respective subset of coils being coupled in series with the other coil of the respective pair and the second Delta configuration in which one set of three subsets of coils are coupled in a single Delta configuration, the coils of each respective subsets of coils being coupled in series with the other coil of the respective pair, the number of coils in each subset being equal or greater than two.

4. The system of claim 1 wherein the switching assembly is operable to selectively electrically couple the coils of the electric machine in a parallel two Wye configuration and a parallel two Delta configuration, the parallel two Wye configuration in which two sets of three coils are each coupled in a respective Wye configuration, and the two sets Wye coupled coils are coupled in parallel to one another, and the parallel two Delta configuration in which two sets of three coils are each coupled in a respective Delta configuration, and the two sets Delta coupled coils are coupled in parallel to one another.

5. The system of claim 1, further comprising:
the electric machine, the electric machine having a number of phases, and for each phase a respective set of a plurality of coils electrically wound in series.

6. The system of claim 5 wherein the electric machine is a rotating electric machine.

7. The system of claim 6 wherein the rotating electric machine includes a switching path between two subsets of coils in the respective set of the plurality of coils for each of the number of phases, the switching path including at least one of the plurality of switches, operation of which selectively divides the two subsets of coils wound in series.

8. The system of claim 1 wherein the first set of electrical contacts carried by the first substrate includes all of the electrical contacts carried by the first substrate, the second set of electrical contacts carried by the second substrate includes all of the electrical contacts carried by the second substrate, and the first set of electrical contacts includes more electrical contacts than the second set of electrical contacts.

9. A system comprising:
a switching assembly including:
    a first substrate;
    a first set of electrical contacts carried by the first substrate;

a first set of conductors to electrically coupleable the first set of electrical contacts with coils of an electric machine;

a second substrate including an outer tube having at least one side wall that delineates an interior of the outer tube from an exterior thereof, the at least one side wall of the outer tube having an inner surface;

a second set of electrical contacts carried by the second substrate, wherein at least one of the first substrate and the second substrate is movable relative to the other of the first substrate and the second substrate such that a plurality of subsets of the first set of electrical contacts are selectively, electrically coupleable to at least a portion of the second set of electrical contacts to change an effective winding configuration of the electric machine, wherein the first substrate includes an inner tube received at least partially in the interior of the outer tube and mounted for rotation with respect to the outer tube about at least one rotational axis, the inner tube having at least one side wall that delineates an interior of the inner tube from an exterior thereof, the at least one side wall of the inner tube having an outer surface, and wherein rotation of the inner tube relative to the outer tube selectively engages one of the plurality of subsets of the first set of electrical contacts carried by the inner tube with at least a portion of the second set of electrical contacts carried by the outer tube.

10. The system of claim 9 wherein the second set of electrical contacts carried by the outer tube are carried on the inner surface of the side wall of the outer tube.

11. The system of claim 9 wherein the second set of electrical contacts carried by the outer tube are carried on the outer surface of the side wall of the inner tube.

12. The system of claim 9 wherein the second set of electrical contacts carried by the outer tube are arrayed in a plurality of rows, each of the plurality of rows arranged parallel to the rotational axis, and each of the plurality of rows arrayed about a perimeter of the outer tube angularly spaced from others of the plurality of rows.

13. The system of claim 12 wherein each of the plurality of rows are uniformly angularly spaced from adjacent ones of the plurality of rows.

14. The system of claim 9 wherein the first set of electrical contacts carried by the inner tube are arrayed in a plurality of rows, each of the plurality of rows arranged parallel to the rotational axis, and each of the plurality of rows arrayed about a perimeter of the inner tube angularly spaced from others of the plurality of rows.

15. The system of claim 14 wherein the first set of electrical contacts carried by the inner tube includes a plurality of groups, each of the plurality of groups includes at least one of the plurality of rows, the rows within a given group angularly spaced from adjacent ones of the rows within the given group by a first angular spacing, and each of the plurality of groups spaced from adjacent ones of the plurality of groups by a second angular spacing, the second angular spacing greater than the first angular spacing.

16. The system of claim 15 wherein:
the plurality of groups includes a first group, a second group, and a third group;
the first group has a first center, the second group has a second center angularly spaced 120 degrees from the first center, and the third group has a third center angularly spaced 120 degrees from both the first center and the second center.

17. The system of claim 16 wherein the first group, the second group, and the third group each include an equal number of the plurality of sets.

18. The system of claim 17 wherein each of the plurality of sets includes an equal number of the plurality of electrical contacts carried by the inner tube.

19. The system of claim 9, further comprising:
a first bearing that rotatable couples the inner tube to the outer tube.

20. The system of claim 19, further comprising:
a second bearing that rotatable couples the inner tube to the outer tube, the first bearing located proximate a first end of the inner tube and the second bearing located proximate a second end of the inner tube, the second end of the inner tube opposed across a length of the inner tube from the first end of the inner tube.

21. The system of claim 9 wherein:
when the inner tube is at a first angular orientation with respect to the outer tube a first subset of the first set of electrical contacts carried by the inner tube are engaged with a first subset of the second set of electrical contacts carried by the outer tube; and
when the inner tube is at the first angular orientation with respect to the outer tube further rotation of the inner tube relative to the outer tube disengages the first subset of the first set of electrical contacts carried by the inner tube from the first subset of the second set of electrical contacts carried by the outer tube, and selectively engages a second subset of the first set of electrical contacts carried by the inner tube with the first subset of the second set of electrical contacts carried by the outer tube.

22. The system of claim 9 wherein:
when the inner tube is at a first angular orientation with respect to the outer tube a first subset of the first set of electrical contacts carried by the inner tube are engaged with a first subset of the second set of electrical contacts carried by the outer tube; and
when the inner tube is at the first angular orientation with respect to the outer tube further rotation of the inner tube relative to the outer tube disengages the first subset of the first set of electrical contacts carried by the inner tube from the first subset of the second set of electrical contacts carried by the outer tube, and selectively engages a second subset of the first set of electrical contacts carried by the inner tube with a second subset of the second set of electrical contacts carried by the outer tube.

23. The system of claim 9, further comprising a set of circuitry and a printed circuit board upon which the set of circuitry is mounted.

24. The system of claim 23, further comprising a wiring harness that couples wire leads from each of the first set of electrical contacts carried by the inner tube to the printed circuit board, and wherein the printed circuit board is mounted within the interior of the inner tube.

25. A system comprising:
a switching assembly including:
a first substrate;
a first set of electrical contacts carried by the first substrate;
a first set of conductors to electrically coupleable the first set of electrical contacts with coils of an electric machine;
a second substrate;
a second set of electrical contacts carried by the second substrate, wherein at least one of the first substrate and the second substrate is movable relative to the other of the first substrate and the second substrate such that a plurality of subsets of the first set of electrical contacts are selectively, electrically coupleable to at least a portion of the second set of electrical contacts to change an effective winding configuration of the electric machine; and a control system communicatively coupled to control relative movement of the first substrate and the second substrate during operation of the electric machine while under load.

* * * * *